United States Patent
Zheng et al.

(10) Patent No.: US 8,200,638 B1
(45) Date of Patent: Jun. 12, 2012

(54) INDIVIDUAL FILE RESTORE FROM BLOCK-LEVEL INCREMENTAL BACKUPS BY USING CLIENT-SERVER BACKUP PROTOCOL

(75) Inventors: Ling Zheng, Sunnyvale, CA (US); Hsing Yuan, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 623 days.

(21) Appl. No.: 12/391,842

(22) Filed: Feb. 24, 2009

Related U.S. Application Data

(63) Continuation-in-part of application No. 12/113,060, filed on Apr. 30, 2008.

(51) Int. Cl.
*G06F 7/00* (2006.01)
*G06F 17/00* (2006.01)

(52) U.S. Cl. .......... 707/679; 707/680; 707/681

(58) Field of Classification Search ........... 707/999.201, 707/646, 679, 680, 681
See application file for complete search history.

(56) References Cited

U.S. PATENT DOCUMENTS

| | | | |
|---|---|---|---|
| 5,642,505 A | 6/1997 | Fushimi | |
| 5,859,972 A | 1/1999 | Subramaniam et al. | |
| 5,956,725 A | 9/1999 | Burroughs et al. | |
| 5,983,324 A | 11/1999 | Ukai et al. | |
| 6,289,356 B1 | 9/2001 | Hitz et al. | |
| 6,993,539 B2 | 1/2006 | Federwisch | |
| 7,143,307 B1 | 11/2006 | Witte et al. | |
| 7,200,726 B1 | 4/2007 | Gole et al. | |
| 7,409,494 B2 | 8/2008 | Edwards et al. | |
| 7,555,620 B1 | 6/2009 | Manley | |
| 7,631,159 B1 | 12/2009 | Krishnamurthy | |
| 7,694,088 B1 * | 4/2010 | Bromley et al. | 711/162 |
| 7,743,028 B1 * | 6/2010 | Stringham et al. | 707/646 |
| 7,809,692 B1 | 10/2010 | Pruthi et al. | |
| 2002/0133491 A1 | 9/2002 | Sim et al. | |
| 2003/0093439 A1 | 5/2003 | Mogi et al. | |
| 2003/0182502 A1 | 9/2003 | Kleiman et al. | |
| 2004/0030668 A1 | 2/2004 | Pawlowski et al. | |
| 2004/0221125 A1 | 11/2004 | Ananthanarayanan et al. | |
| 2005/0246382 A1 | 11/2005 | Edwards | |
| 2006/0143238 A1 | 6/2006 | Tamatsu | |
| 2006/0155775 A1 | 7/2006 | Yamasaki | |
| 2006/0218561 A1 | 9/2006 | Moir et al. | |

(Continued)

FOREIGN PATENT DOCUMENTS

WO  WO-2005048085 A2  5/2005

OTHER PUBLICATIONS

Written Opinion PCT/US2008/087661 dated Jun. 26, 2009; pp. 1-4.

(Continued)

*Primary Examiner* — Vincent Boccio
(74) *Attorney, Agent, or Firm* — Perkins Coie LLP

(57) ABSTRACT

A network storage server restores a selected file or files from a block-level backup of a data set that contains multiple files, by using a client-server backup protocol, without restoring the entire data set. The backup can include at least one incremental backup image, in which case the file can be restored at least partially from the incremental backup image. A particular version of a file can also be restored, from a block-level backup image that includes multiple snapshots, by automatically selecting a particular snapshot associated with that version of the file, from the backup image, and using the selected snapshot to restore the file.

39 Claims, 14 Drawing Sheets

U.S. PATENT DOCUMENTS

| | | | |
|---|---|---|---|
| 2007/0043790 | A1 | 2/2007 | Kryger |
| 2007/0162515 | A1 | 7/2007 | Sarma et al. |
| 2007/0266066 | A1 | 11/2007 | Kapoor et al. |
| 2008/0077762 | A1 | 3/2008 | Scott et al. |
| 2008/0133828 | A1 | 6/2008 | Saito |
| 2008/0243958 | A1 | 10/2008 | Prahlad et al. |
| 2009/0019362 | A1 | 1/2009 | Shprigel et al. |
| 2009/0112703 | A1 | 4/2009 | Brown |
| 2009/0125701 | A1 | 5/2009 | Suponau et al. |
| 2009/0313503 | A1 | 12/2009 | Atluri et al. |
| 2010/0077160 | A1 | 3/2010 | Liu et al. |

OTHER PUBLICATIONS

International Search Report PCT/US2008/087661 dated Jun. 26, 2009; pp. 1-3.
Co-pending U.S. Appl. No. 11/963,473, filed Dec. 21, 2007.
Non-Final Office Action Mailed Nov. 11, 2010 in Co-Pending U.S. Appl. No. 11/963,473, filed Dec. 21, 2007.
Non-Final Office Action Mailed Feb. 1, 2011 in Co-pending U.S. Appl. No. 12/113,060, filed Apr. 30, 2008.
Final Office Action Mailed Feb. 17, 2011 in Co-pending U.S. Appl. No. 12/113,049, filed Apr. 30, 2008.
Non-Final Office Action Mailed Oct. 6, 2010 in Co-pending U.S. Appl. No. 12/113,049, filed Apr. 30, 2008.
Co-pending U.S. Appl. No. 12/113,060, filed Apr. 30, 2008.
Co-pending U.S. Appl. No. 12/391,849, filed Feb. 24, 2009.
Non-Final Office Action Mailed May 11, 2010 in Co-Pending U.S. Appl. No. 11/963,473, filed Dec. 21, 2007.
Co-pending U.S. Appl. No. 12/488,468, filed Jun. 19, 2009.
Non-Final Office Action Mailed Aug. 18, 2010 In Co-pending U.S. Appl. No. 12/113,060, filed Apr. 30, 2008.
Co-pending U.S. Appl. No. 12/871,778, filed Aug. 30, 2010.
Non-Final Office Action mailed Oct. 6, 2010 in Co-pending U.S. Appl. No. 12/113,060, filed Apr. 30, 2008.
Co-pending U.S. Appl. No. 12/113,049 of Zheng, L., et al., filed Apr. 30, 2008.
Non-Final Office Action Mailed Aug. 8, 2011 in Co-pending U.S. Appl. No. 12/488,468 of Zheng, L., et al., filed Jun. 19, 2009.
Non-Final Office Action Mailed Oct. 11, 2011 in Co-pending U.S. Appl. No. 12/391,849 of Zheng, L., et al., filed Feb. 24, 2009.
Final Office Action Mailed Nov. 17, 2010 in Co-Pending U.S. Appl. No. 11/963,473 of Mukherjee, S., filed Dec. 21, 2007.
Non-Final Office Action Mailed Dec. 8, 2011 in Co-Pending U.S. Appl. No. 11/963,473 of Mukherjee, S., filed Dec. 21, 2007.
Final Office Action Mailed Feb. 6, 2012 in Co-pending U.S. Appl. No. 12/488,468 of Zheng, L, et al., filed Jun. 19, 2009.
Notice of Allowance Mailed Oct. 26, 2011in Co-pending U.S. Appl. No. 12/113,060 of Zheng, L., et al., filed Apr. 30, 2008.
Notice of Allowance Mailed Jan. 30, 2012 in Co-pending U.S. Appl. No. 12/113,049 of Zheng, L., et al., filed Apr. 30, 2008.

\* cited by examiner

FIG. 5A

Backup Image 520: Data Block | Metadata Block | Metadata Block | ... | Data Block | Data Block | Metadata Block | Data Block

FIG. 5B

Backup Image 510:
- Data Warehouse 501: Data Block | Data Block | ... | Data Block
- Metadata Map 502: Metadata Block | Metadata Block | ... | Metadata Block

INDIVIDUAL FILE RESTORE FROM BLOCK-LEVEL INCREMENTAL BACKUPS BY USING CLIENT-SERVER BACKUP PROTOCOL

This is a continuation-in-part of U.S. patent application Ser. No. 12/113,060, filed on Apr. 30, 2008 and entitled, "Single File Restore from Image Backup by Using an Independent Block List for Each File" of L. Zheng et al., which is incorporated herein by reference.

FIELD OF THE INVENTION

The invention in general pertains to network storage systems, and more particularly, to a storage server that manages block-level backups and restoration based on a client-server backup protocol.

BACKGROUND

Conventionally, files and directories in a storage subsystem can be backed up with file-level operations. File-level backups build individual files and directories on backup storage (e.g., tapes) by going through a file system, which typically employs hierarchical storage structures. File-level backup techniques back up data on a file-by-file basis, because a file is the smallest addressable unit of data that the backup software can handle. File-level backup techniques and protocols generally have limited backup performance due to various file system overheads. For example, a backup operation for small files, dense directories, or fragmented file locations generally involves small reads and random disk access, which in turn incur a significant file system overhead.

Further, with file-level backup techniques, the files often have to be backed up in a certain order, such as inode-based ordering and directory tree based ordering. For each file, file-level backup techniques have to backup the data from the beginning to the end. The constraint imposed by the ordering limit the performance. For example, the dump format of Berkeley Software Distribution (BSD), further imposes strict ordering constraints among files, as well as data blocks of a file. A "block", in this context, is the smallest amount of contiguous data that can be addressed by a file system.

Additionally, file-level backup techniques are often unable to provide a sufficient data input rate to a tape drive, which causes a shoe-shining effect to occur. The shoe-shining effect occurs during tape reads or writes, when the data transfer rate falls below a minimum threshold at which the tape drive heads are designed to transfer data to a running tape. When the shoe-shining effect occurs, the tape drive stops, rewinds back the tape, accelerates again to a proper speed, and continues writing from the same position. The shoe-shining effect significantly reduces the backup performance.

Other problems with file-level backups also exist. For example, file-level backups do not preserve metadata used by the storage system. Although a restore operation will restore user data, it cannot restore the metadata in the original volume. Loss of the metadata may result in loss of the functionality that users may have on the original volume.

Another type of backup technique is block-level backup, also called image-based backup. Block-level backup techniques generally allow for better performance than file-level backups. A block-level backup creates a backup image in a backup storage facility by using blocks as the smallest addressable unit of the backup software, rather than files (a file typically includes numerous blocks). An example of a product which can perform block-level backup and restore is the SNAPMIRROR® TO TAPE™ software made by NETAPP®, Inc. of Sunnyvale, Calif. In general, block-level backup and restore can be performed faster than file-level backup, because a block-based backup operation does not need to go through a file system in order to create or restore a backup. Further, reads at the block-level are performed sequentially in terms of physical blocks on disk, which reduces latency.

A disadvantage of known block-level backup techniques, however, is that they do not provide the ability to restore only a single selected file or selected files from a backup image. This is because the backup software is not aware of the file structure of the data in the backup image. Consequently, with known block-level backup techniques it is necessary to restore the entire backup image (e.g., an entire volume), including all files contained in it, even if the user only wants to restore a single file from that image. This is a very resource intensive process and, depending on the size of the backup image, it can take a long time to complete (hours or even days). In addition, known block-level data techniques do not provide the ability to create and restore from an incremental backup.

Further, known block-level backup techniques, such as associated with network file system (NFS) or common Internet file system (CIFS), are client-side-only (local) backup techniques. On the other hand, client-server backup protocols such as network data management protocol (NDMP) are designed to support file level backup only and thus do not have the ability to perform block-level backups or restores.

SUMMARY

The technique introduced here enables a network storage server to restore a selected file or files identified in a client request, from a block-level backup of a data set (e.g., a volume) that contains multiple files, by using a client-server backup protocol, without having to restore the entire data set. The backup includes at least one incremental backup image, and the file can be restored at least partially from one or more such incremental backup images.

As described further below, a backup set can include multiple backup images, any one or more of which may be used to restore a given file. Each backup image represents, and includes data blocks of, one or more point-in-time images ("snapshots") of the data set. The individual backup images in a backup set have no data blocks in common; that is, aside from the initial snapshot, a given backup image includes only those blocks of subsequent snapshots that are different from the earlier snapshots in the backup set.

The technique introduced here also enables a network storage server to restore a selected version of a selected file identified in a client request, from a block-level backup image of a data set that contains multiple files, where the backup image includes multiple snapshots of the data set, by using a client-server backup protocol. The restore of the selected version of the selected file can be accomplished without having to restore the entire data set. Multiple versions of a selected file can also be restored, according to a client request, by using two or more snapshots or backup images in a backup set.

In addition, when the storage server determines that a different backup image in the backup set is needed to continue restoration of a file (i.e., that a different backup image contains the needed blocks), the storage server can automatically suspend restoration of the file and send a request to the backup client to change from one backup image to another. The storage server then resumes restoration of the file after receiving an indication that the client has switched backup images. The above-described operations can be implemented as extensions to the NDMP direct access recovery (DAR) mechanism, for example.

Other aspects of the technique introduced here will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIGS. 5A-5C illustrate examples of the format of a backup image.

DETAILED DESCRIPTION

Figure 1:
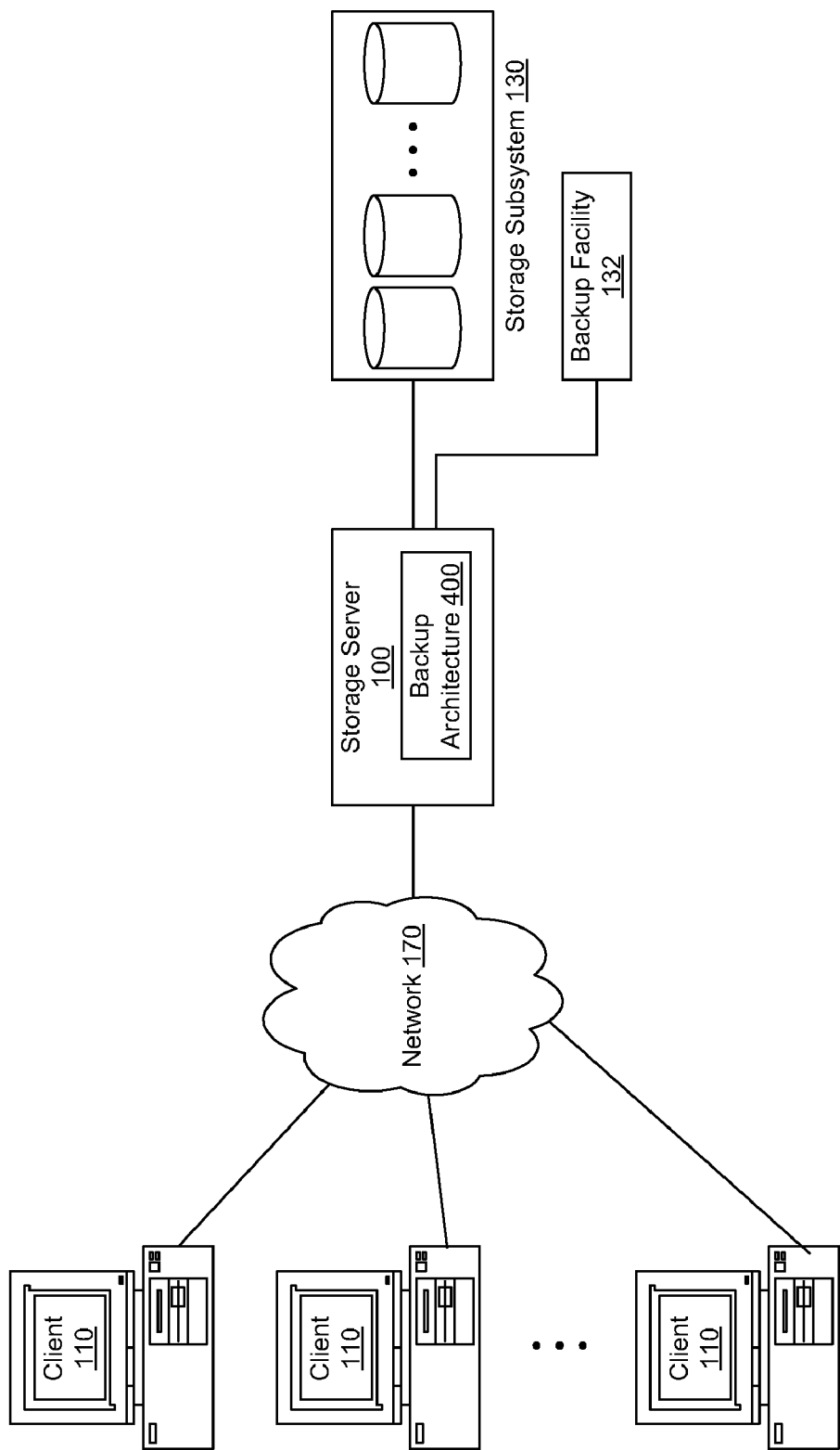
FIG. 1 illustrates a network environment which includes a storage server coupled to a storage subsystem.

References in this specification to "an embodiment", "one embodiment", or other similar phrases, mean that the particular feature, structure or characteristic being referred to is included in at least one embodiment of the present invention. However, occurrences of such phrases in this specification do not necessarily all refer to the same embodiment. On the other hand, not all of the described embodiments are necessarily mutually exclusive.
Multiple-Mode Restore Image-based (block-level) data restoration restores data of a volume from one or more backup images that are created by one or more image-based backup operations. A data block may be a block of a file or a directory. The backup image is designed to support time-efficient backup operations as well as space-efficient backup storage. With respect to time efficiency, the data blocks can be stored without any ordering constraints imposed on the data blocks. With respect to space efficiency, all of the in-use data blocks in a volume (the term "volume" will be explained in greater detail below) are backed up without duplicating common data blocks. Further, the data blocks and metadata of the data blocks are read and stored with low-level disk I/O operations that incur minimal overhead, without using file system operations (illustratively, file open, directory read, etc).

Image-based data restoration as described herein can concurrently support several restore modes, as described further below. The restore modes include an image restore mode and a logical restore mode. In one embodiment, the image restore mode supports restoration of an entire image of the volume and is file system version dependent; whereas the logical restore mode allows data to be restored into different file system versions and different file system types and, thus, allows file system independent restoration. The logical restore mode supports restoration of a selected file, or multiple selected files, or entire directories of a volume. With the logical restore mode, selective one or more files can be restored from a backup image without restoring the entire image. Further, one or more files can be restored from a backup image even if some tape blocks are unreadable.

Each backup operation creates a backup image that includes one or more point-in-time images (hereinafter "snapshots") of a volume in a storage subsystem. Backing up multiple snapshots in one backup operation increases the efficiency of the backup performance. The backup is performed on a block-by-block basis. To reduce storage space, common data blocks of the snapshots are not duplicated in the backup image. In one embodiment, a backup image includes one or more snapshots with all of the data blocks. Alternatively, a backup image may include selective snapshots as determined by a user of the storage system, such as a system administrator.

Before further discussing details of the image-based data restoration, it is useful to define certain terminology. In some conventional storage servers, data is stored in logical containers called volumes and aggregates. An "aggregate" is a logical container for a pool of storage, combining one or more physical mass storage devices (e.g., disks) or parts thereof into a single logical storage object, which contains or provides storage for one or more other logical data sets at a higher level of abstraction (e.g., volumes). A "volume" is a set of stored data associated with a collection of mass storage devices, such as disks, which obtains its storage from (i.e., is contained within) an aggregate, and which is managed as an independent administrative unit. A volume includes one or more file systems, such as an active file system and, optionally, one or more persistent point-in-time images of the active file system captured at various instances in time. A "file system" is an independently managed, self-contained, hierarchal set of data units (e.g., files, blocks, or logical unit numbers (LUNs)). Although a volume or file system (as those terms are used herein) may store data in the form of files, that is not necessarily the case. That is, a volume or file system may store data in the form of other units of data, such as blocks or LUNs.

To keep track of the organization of blocks stored in an aggregate, a storage server maintains various hierarchical data structures, called buffer trees. A buffer tree can represent a volume defined within an aggregate, or a file or a directory defined within a volume. The root of the buffer tree is known as an "inode", which is a metadata container that contains metadata about the file or the directory. The metadata in an inode can include information about the type of the file/directory, the size of the file/directory, time stamps (e.g., access and/or modification time), permissions and ownership of the file/directory. A directory inode contains a list of filenames of the files in the directory and the corresponding inode numbers of those files. A file inode contains a list of volume block numbers (VBNs) that identify data blocks owned by the corresponding file. The use of data blocks and inodes to create a backup image will be described in greater detail with reference to FIGS. 5 and 6.

A buffer tree typically includes both levels, each including numerous blocks, the root of which is the inode. Some blocks in a buffer tree contain actual user-level data—these are referred to as "direct blocks". Other blocks in a buffer tree may simply contain metadata, such as pointers to lower-level blocks—these are referred to as "indirect blocks". There can be multiple levels of indirect blocks in a buffer tree, however, there is always only one level of direct blocks, which is the lowest level of the buffer tree.

Every inode and indirect block in a buffer tree includes a pointer to each lower-level block that it references; each such pointer is called a volume block number (VBN). Each VBN corresponds to, but is not necessarily the same as, a corresponding disk block number (DBN), which indicates the physical location of the target data block on a disk. In addition, each direct block also has a corresponding file block number (FBN), which represents the logical (sequential) position of the block within a file, relative to other data blocks in the file.

FIG. 1 shows an example of a network environment in which a storage server 100 operates. The storage server 100 can be a file server or "filer," in which the image-based backup described herein can be implemented. It should also be noted that the image-based backup described herein can be applied in other types of storage systems, such as storage servers, which provide clients with either or both of block-level access and file-level access to stored data or processing systems other than storage servers, and network devices configured to provide storage services.

Referring to FIG. 1, the storage server 100 includes a backup architecture 400, which will be described in greater detailed in connection with FIG. 4, for creating and restoring a backup image. The storage server 100 is coupled to a storage subsystem 130 which includes an array of mass storage devices (e.g., disks), and to backup storage 132 (e.g., tapes). The storage server 100 is also coupled to storage clients 110 (hereinafter simply "clients") through a network 170. The network 170 may be, for example, a local area network (LAN), a wide area network (WAN), a metropolitan area network (MAN), a global area network (GAN), such as the Internet, a Fibre Channel fabric, or the like, or a combination of any such types of networks. Each of the clients 110 may be, for example, a conventional personal computer (PC), server-class computer, workstation, or the like.

The storage subsystem 130 is managed by the storage server 100. The storage server 100 receives and responds to various read and write requests from the clients 110, directed to data stored in or to be stored in the storage subsystem 130. The mass storage devices in the storage subsystem 130 may be, for example, conventional magnetic disks, optical disks such as CD-ROM or DVD-based storage, magneto-optical (MO) storage, or any other type of non-volatile storage devices suitable for storing large quantities of data.

Although illustrated as a self-contained element, the storage server 100 may have a distributed architecture; for example, it may include a separate N-("network") module and D-("data") module (not shown). In such an embodiment, the N-module is used to communicate with clients 110, while the D-module includes the file system functionality and is used to communicate with an associated one of the storage subsystems 130. The N-module and D-module can communicate with each other using an internal protocol. Alternatively, the storage server 100 may have an integrated architecture, where the network and data components are all contained in a single box. The storage server 100 may also be coupled through a switching fabric to other similar storage servers (not shown) which have their own local storage subsystems. In this way, all of the storage subsystems 130 can form a single storage pool, to which any client of any of the storage servers has access.

Illustratively, the storage server 100 may be a storage server product of NetApp Inc., Sunnyvale, Calif., that uses the NetApp® Data ONTAP® storage operating system. However, it is expressly contemplated that any appropriate storage server and storage operating system may be enhanced for use in accordance with the image-based backup described herein.

Figure 2:
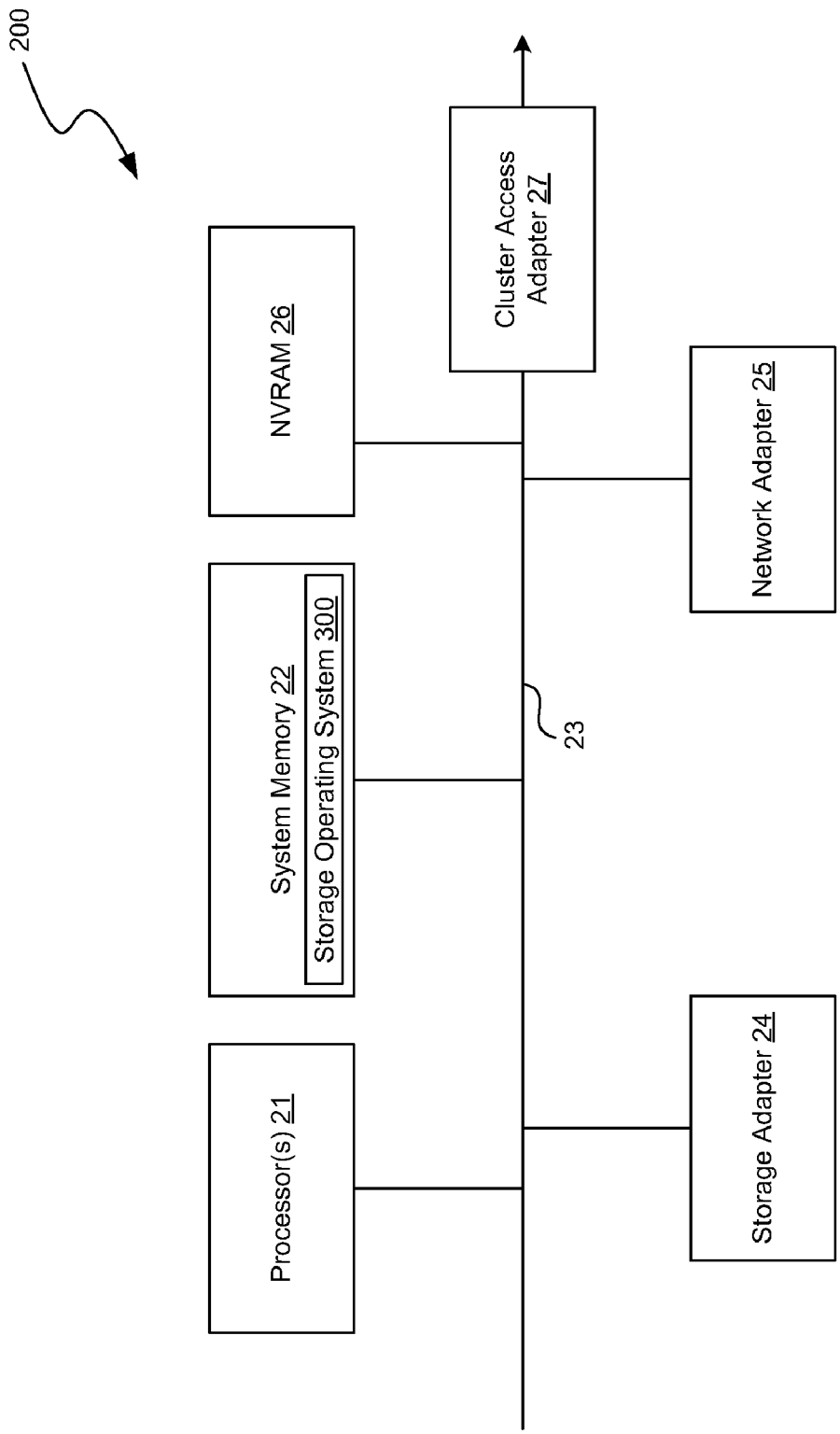
FIG. 2 illustrates an example of the hardware architecture of a storage server.

FIG. 2 is a block diagram 200 showing an example of the architecture of the storage server 100 at a high level. Certain standard and well-known components, which are not germane to the present invention, are not shown. The storage server 100 includes one or more processors 21 and memory 22 coupled to a bus system 23. The bus system 23 shown in FIG. 2 is an abstraction that represents any one or more separate physical buses and/or point-to-point connections, connected by appropriate bridges, adapters and/or controllers. The bus system 23, therefore, may include, for example, a system bus, a form of Peripheral Component Interconnect (PCI) bus (such as PCI, PCI-X or PCI Express), HyperTransport or industry standard architecture (ISA) bus, small computer system interface (SCSI) bus, universal serial bus (USB), Inter-IC (I2C) bus, or Institute of Electrical and Electronics Engineers (IEEE) standard 1394 bus (sometimes referred to as "Firewire").

The processors 21 are the central processing units (CPUs) of the storage server 100 and, thus, control its overall operation. In certain embodiments, the processors 21 accomplish this by executing software stored in memory 22. Such processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 22 includes the main memory (i.e., the "system memory") of the storage server 100. Memory 22 represents any form of random access memory (RAM), read-only memory (ROM), flash memory, or the like, or a combination of such devices. Memory 22 stores (among other things) a storage operating system 300, which can implement the image-based backup and restoration described herein.

Also connected to the processors 21 through the bus system 23 are a storage adapter 24, a network adapter 25 and a cluster access adapter 27. The storage adapter 24 allows the storage server 100 to access the storage subsystem 130 of FIG. 1, and may be, for example, a Fibre Channel adapter or a SCSI adapter. The network adapter 25 provides the storage server 100 with the ability to communicate with remote devices, such as the clients 110, over a network and may be, for example, an Ethernet adapter, a Fibre Channel adapter, or the like. The cluster access adapter 27 couples the storage server 100 to other nodes of the cluster over a cluster switching fabric. In some embodiments, the cluster access adapter 27 connects to other nodes of the cluster through an InfiniBand connection.

The storage server 100 also includes non-volatile random access memory (NVRAM) 26 to provide fault-tolerant backup of data. The NVRAM 26 is typically a large-volume solid-state memory array having either a backup battery, or other built-in last-state-retention capabilities (e.g. a FLASH memory), that holds the last state of the memory in the event of any power loss to the array. In some embodiments, the NVRAM 26 and the system memory 22 may not have a direct connection to the bus system 23, but may be accessible through other components (e.g., the processor 21) to the bus system 23.

Figure 3:
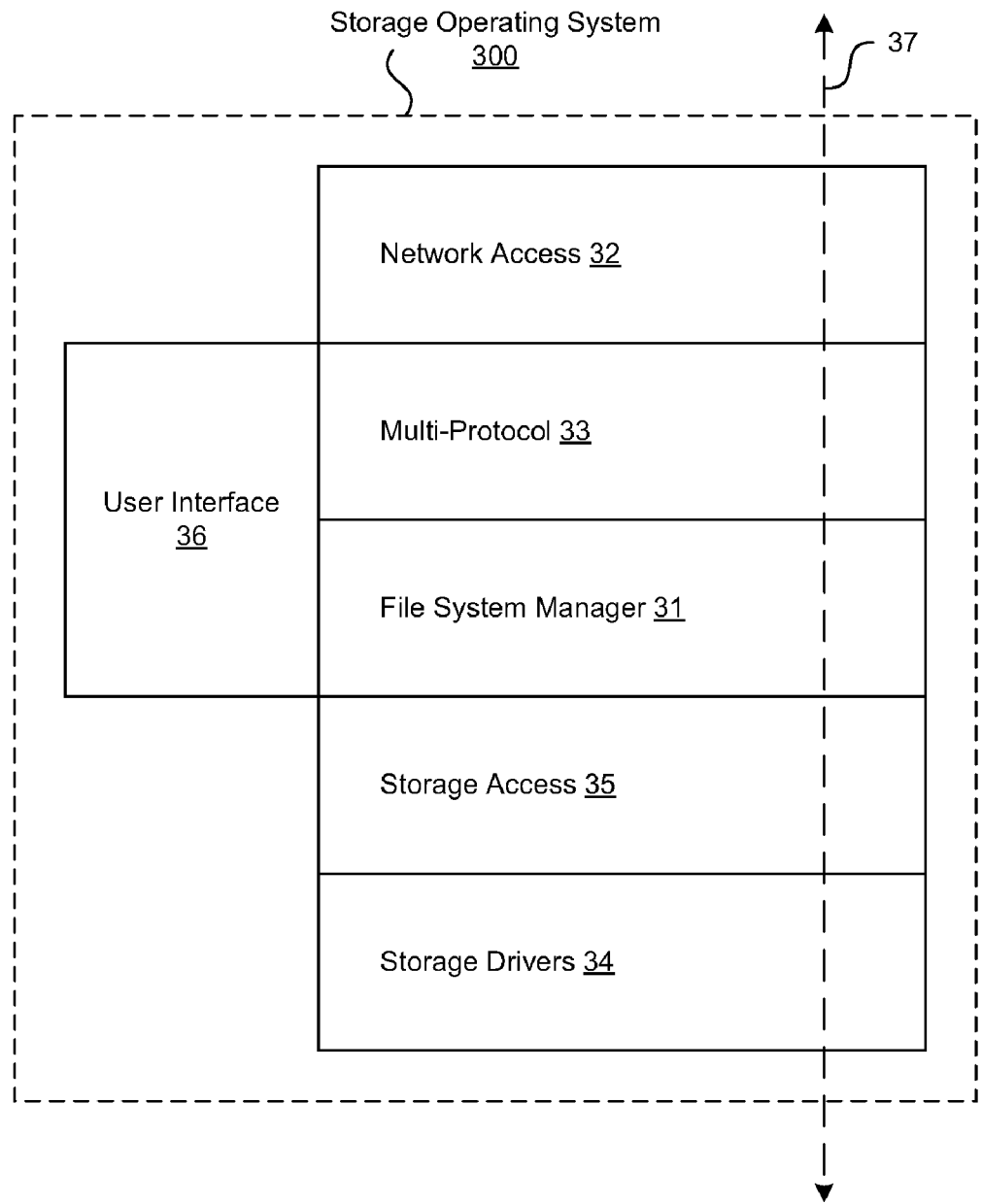
FIG. 3 illustrates the architecture of an operating system of the storage server according to an embodiment of the invention.

FIG. 3 illustrates an example of the storage operating system 300 for controlling the operations of the storage server 100. The storage operating system 300 and its constituent elements are preferably implemented in the form of software. However, in some embodiments, some or all of the elements of the operating system may be implemented in the form of hardware (e.g., specially designed circuitry), or as a combination of hardware and software.

As shown, the storage operating system 300 includes several modules, or "layers". These layers include a file system manager 31. The file system manager 31 is software that manages the one or more file systems managed by the storage server 100. In particular, the file system manager 31 imposes a hierarchy (e.g., a directory/file structure) on the data stored in the storage subsystem 130 and manages client-initiated read and write operations at a high level (while delegating certain functions to lower layers of the storage operation system 300).

To allow the storage server 100 to communicate over the network 170 (e.g., with clients 110), the storage operating system 300 also includes a network access layer 32, and a multi-protocol layer 33 operatively coupled between the file system manager 31 and the network access layer 32. The multi-protocol layer 33 includes a number of higher-level network protocols, such as Network File System (NFS), Common Internet File System (CIFS) and/or Hypertext Transfer Protocol (HTTP) running over Transmission Control Protocol/Internet Protocol (TCP/IP); and/or Internet SCSI (iSCSI) and/or Fibre Channel Protocol (FCP). The network access layer 32 includes one or more drivers which implement one or more lower-level protocols to communicate over the network, such as Ethernet or Fibre Channel.

To enable the storage 100 to communicate with the storage subsystem 130, the storage operating system 300 includes a storage driver layer 34, and a storage access layer 35 operatively coupled between the file system manager 31 and the storage driver layer 34. The storage access layer 35 implements a higher-level disk storage protocol, such as RAID-4, RAID-5 or RAID-DP, while the storage driver layer 34 implements a lower-level storage device access protocol, such as Fibre Channel Protocol (FCP) or SCSI. The storage access layer 35 is alternatively called the "RAID layer" in this description.

Also shown in FIG. 3 is the path 37 of data flow, through the storage operating system 300, associated with a client-initiated read or write request.

The storage operating system 300 also includes a user interface 36 to generate a command line interface (CLI) and/or graphical user interface (GUI), to allow administrative control and configuration of the storage server 100, from a local or remote terminal.

Figure 4:
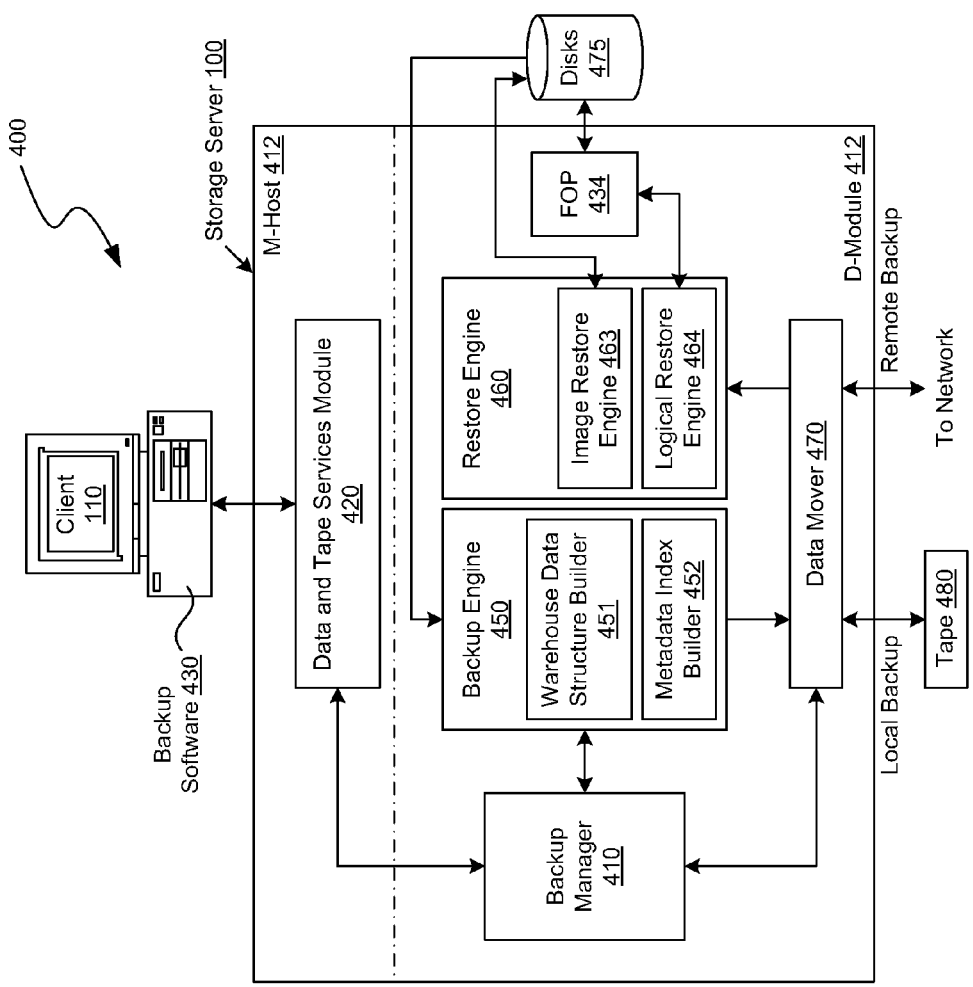
FIG. 4 illustrates an example of a backup architecture for backing up images of a volume serviced by the storage server.

FIG. 4 illustrates an embodiment of a backup architecture 400 for implementing the image-based backup described herein. Components that are not germane to the purpose of the discussion are not shown. The backup architecture 400 may be implemented by hardware (e.g., circuitry, dedicated logic, programmable logic, microcode, etc.), software (such as instructions run on a processing device), or a combination thereof. In one embodiment, the backup architecture 400 may be located on one or more storage servers 100, and implemented by the components of the storage operating system 300. In the embodiment shown in FIG. 4, the backup architecture 400 includes an M-host 411 and a D-module 412. The M-host 411 is an application that may be located on a host separate from the storage server 100; or, in the embodiment as shown, located on the storage server 100. In the embodiment of FIG. 4, the M-host 411 interacts with the storage operating system 300 to provide a user space environment for accessing data in a local node and cluster nodes. The D-module 412 manages the storage subsystem 130 of a local node, and can be implemented by the storage driver layer 34 of the storage operating system 300.

Referring to FIG. 4, a data and tape services module 420 interfaces with users or client-side backup software 430 to configure and manage the backup environment. The data and tape services module 420 may be part of the M-host 411 or a module separate from the M-host 411. In one embodiment, the data and tape services module 420 operates in accordance with NDMP. NDMP is a client-server protocol for backup and restore of heterogeneous network-attached storage, by which backup software on a client machine on a network can manage backup and restore jobs running on a network storage server. Conventional NDMP is designed to support file-level backups only. The backup architecture 400 can work with and extend NDMP to provide image-based backups through the NDMP, as described in greater detail below. The data and tape services module 420 provides an interface at the server side to communicate with the client-side backup software 430. The data and tape services module 420 also forwards client-side requests to the D-module 412 to perform requested backup or restore operations.

The D-module 412 may include a backup engine 450 for generating image backup data streams, and a restore engine 460 for restoring the backup data from tapes 480. A data mover 470 interfaces with both the backup engine 450 and the restore engine 460 to perform tape I/O operations. The data mover 470 may interact with the tapes 480 that are locally connected to the storage server 100, or remote backup storage via a network. The D-module 412 may also include a backup manager 410, which coordinates backup operations of the client 110, the data and tape services module 420, the backup engine 450, the restore engine 460 and the data mover 470. Further, the backup manager 410 can be configured to coordinate backup operations in a cluster environment, where one or more of the components of the backup architecture 400 reside on separate storage servers.

When a client sends a request to backup a volume, the backup engine 450 generates a backup image, in one backup operation, that includes all of the point-in-time images ("snapshots") of a volume that are currently stored ("in use") in the storage subsystems 103, or one or more snapshots selected by the client. The backup engine 450 may retrieve data from disks 475 through one or more layers of the storage operating system 300, such as the file system manager 31 and the storage access layer 35. In one embodiment, the backup engine 450 includes a warehouse data structure builder 451 and a metadata index builder 452 to construct a backup image for a volume. The warehouse data structure builder 451 of the backup engine 450 retrieves data blocks from the disks 475, and stores the data blocks in a backup image. The metadata index builder 452 retrieves metadata of the data blocks from the disks 475 and stores the metadata in the backup image. The metadata provides the logical restore engine 464 of the restore engine 460 with the ability to restore the entire image or selectively restore one or more files from the volume, by restoring one file at time. Alternatively, a client may request the restoration of an entire image of the volume. Image restoration is supported by the image restore engine 463, which uses only the data blocks of the backup image.

In one embodiment, the restore engine 460 includes an image restore engine 463 for restoration of an entire image of a volume that is file system version dependent. Thus, the image restore engine 463 may only restore a backup image on certain file system versions. Illustratively, if a backup is performed on a system with a file system version X, the image restoration may only be performed on a system with the same file system version X. The image restored by the image restore engine 463 includes all of the blocks in a volume, such as user data and system metadata, and preserves the block layout of the volume. As some system metadata (such as configuration data of the storage operating system 300, features of the data blocks, etc.) is tied to the block layout, the restored image allows the system metadata to continue to function after restoration. The restore engine 460 also includes a logical restore engine 464 for restoration of one, multiple, or entire files and directories of a volume that are file system version independent. Thus, the logical restore engine 464 can perform restoration on a system with any file system version as long as the system supports image-based backup and restore features. However, the logical restore engine 464 changes the block layout, and is, therefore, unable to recover some of the system metadata.

In one embodiment, the logical restore engine 464 saves the restored data in the disks 475 via a file operation module (FOP) 434. The FOP module 434 receives requests from the restore engine 460, generates actions according to the requests, and transforms the actions into file system messages that restore directories and files and save them into the disks 475. Operations of the restore engine 460 and the file operation module 434 will be described in greater detail below in connection with FIG. 8.

Figure 5C:
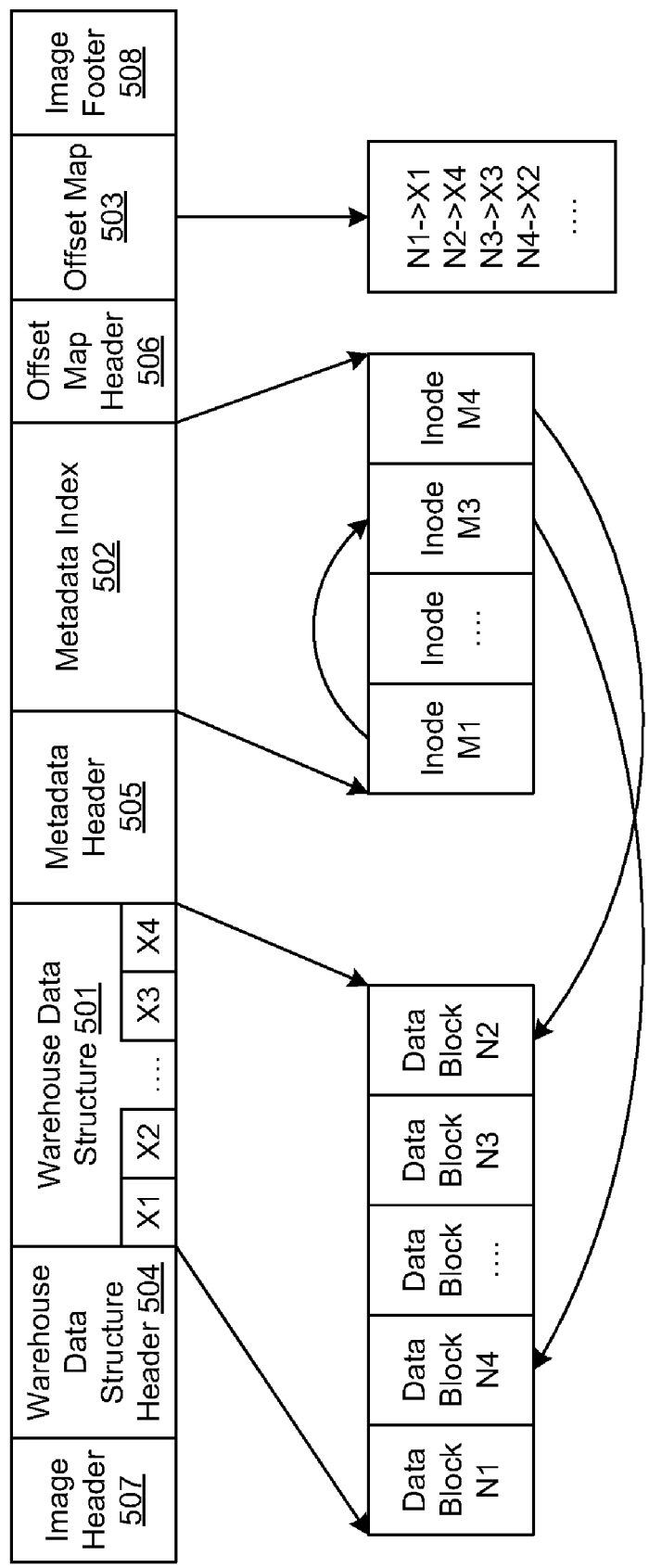

FIGS. 5A-5C show examples of a backup image at a high level. As will be described in greater detail below, the backup image has a structure that can be efficiently generated during backup. The backup image does not retain the buffer tree structure of a volume, as in the storage subsystem 103. Instead, the backup image contains a collection of data blocks and metadata blocks. The data blocks are simply a raw image of the volume. The metadata blocks contain pointers that inter-relate the data blocks.

Referring to FIG. 5A, in one embodiment, a backup image 520 includes a number of data blocks intermixed with a number of metadata blocks. The data blocks include the data blocks that constitute one or more snapshots of a volume, and the metadata blocks include the corresponding metadata of the data blocks. The data blocks and metadata blocks are stored in any order convenient for a backup operation, without any ordering constraints. Illustratively, a data block (or a metadata block) for a more recent snapshot may be stored before or after another data block (or another metadata block) of an older snapshot. In one embodiment, the data blocks and metadata blocks are stored in the backup image 520 in the same order as they are retrieved from disks. The order in which the data blocks and metadata blocks are retrieved from the disks can be determined by the backup engine 450 that is most time efficient.

Referring to FIG. 5B, in another embodiment, a backup image 510 includes a first section, referred to as a warehouse data structure (or simply "data warehouse") 501, for storing data blocks of a volume. The blocks in the warehouse data structure 501 are saved on tape in VBN order. The backup image 510 also includes a second section, referred to as a metadata map (or metadata index) 502, for storing corresponding file system metadata of the data blocks, such as inodes, directory entries, file block VBN list, etc.). Within each of the first and the second sections, the data blocks and the metadata blocks can be stored in any order without any ordering constraints. Alternatively, either or both of the data blocks and the metadata blocks can be stored according to a given order, such as the order of snapshots, VBNs, or the like. In a scenario where the data blocks and/or the metadata blocks are ordered by snapshots, it is unnecessary to impose any ordering constraints within each of the snapshots. The backup images 510 and 520 may include additional sections, such as header and footer, as well as other sections, as discussed below.

In yet another embodiment, shown in FIG. 5C, a backup image 500 includes the warehouse data structure 501, the metadata map 502, an offset map 503, and additional sections 504-508, which will be described in more detailed later. The offset map 503 contains the block offset, on the physical backup storage media, of every data block in the warehouse data structure 501, indexed by VBN, to speed up data retrieval at restore time. In one embodiment, the offset map 503 includes a header containing one or more VBNs, followed by the offsets for those VBNs, in the same order that they appear in the header.

In the embodiments shown in FIGS. 5A-5C, each data block is identified by a VBN. The VBN is the identifier of the data block in the storage subsystem 103 (e.g., disks) of FIG. 1. Each data block has a fixed size, e.g., 4 kilobytes. These data blocks collectively represent one or more snapshots of the volume. The snapshots may include all of the snapshots of the volume that are currently stored in the storage subsystem 103, or one or more specific snapshots selected by a client. In the embodiments of FIG. 5A and FIG. 5B where the data blocks are not ordered by snapshots, each data block may include a snapshot identifier to identify its membership in a snapshot.

The metadata blocks of FIGS. 5A-5C provide the necessary metadata to locate and restore individual directories and files. In one embodiment, each metadata block includes an inode, such as a directory inode or a file inode. Each inode has an identification number (an inode number) and associated attributes including the type of inode (such as a directory inode or a file inode). A directory inode contains a list of filenames of files in the directory and the corresponding inode numbers of those files. A file inode contains a list of VBNs that identify the data blocks owned by the corresponding file. The metadata blocks are a logical representation of a file system structure and, therefore, are independent of on-disk file system format. In the embodiments of FIG. 5A and FIG. 5B where the metadata blocks are not ordered by snapshots, each metadata block may include a snapshot identifier to identify its membership in a snapshot. Further, in the embodiments of FIGS. 5A-5C, the computation of the metadata blocks and the writing of data blocks to a backup image can be executed concurrently to speed up the backup process.

The backup images described above do not include more than one each of any data blocks that are common to any of the snapshots. Only the data blocks that have been changed since an immediate-preceding snapshot are stored in the backup image. Thus, there is no duplication of data blocks in any of the backup images. With respect to metadata blocks, in one embodiment, a backup image contains only the metadata blocks corresponding to the data blocks in that same backup image, and, therefore, there is also no duplication of the metadata blocks in the backup image either. In an alternative embodiment, the metadata blocks for each of the backed up snapshots are stored in their entirety for increased speed during data restoration.

Referring again to FIG. 5C, the backup image 500 also includes a warehouse data structure header 504, a metadata header 505 and an offset map header 506 to mark the beginning of each of the three sections (the warehouse data structure 501, the metadata map 502 and the offset map 503). The backup image 500 further includes an image header 507 and an image footer 508 to mark the beginning and end of the backup image 500. In one embodiment, the image header 507 contains information about the volume backed up in this backup image, such as volume language, density, and the like. The image footer 508 contains summary information of the backup image 500, such as the offsets on tape of the warehouse data structure 501, metadata map 502 and offset map 503 within the backup image 500.

The offset map 503 of the backup image 500 records the block offset, on physical storage (e.g., tape 480), of every data block in the warehouse data structure 501, indexed by VBN. For example, the offset map 503 includes a mapping of the VBN of each data block in the backup image to an offset on tape 480. This can be used during a single file (or multiple selected file) restore to find the needed blocks by converting VBN to a tape offset. Use of the offset map 503 can improve the speed of file restoration. During restore time, the restore engine 460 can take a file inode, identify the list of VBNs belonging to the corresponding file, and use the offset map 503 to locate those data blocks having the identified VBNs. With the use of the offset map 503, it becomes unnecessary for the restore engine 460 to scan the warehouse data structure 501 to look for specific data blocks.

Backup operations can be performed incrementally. For example, a backup operation can be followed by one or more incremental backup operations. Each incremental backup operation generates an incremental backup image, in which only incremental changes from the previous backup operation are stored. A "backup set" includes one or more backup images, including at least a baseline backup image (which is also referred to as a "level-0" backup image), and possibly including one or more incremental backup images. A backup image can span multiple tapes (or other physical backup media). Each backup image (level 0 or incremental) includes data blocks of at least one snapshot of the volume being backed up. A level-0 backup includes all of the data in the volume. An incremental backup includes the changed data since the last backup image was created. Each backup set has a unique identifier. A new backup set is created whenever a level-0 backup is performed.

During a level 0-backup, all of the volume snapshots are captured in the backup image. The earliest snapshot in time is considered the "baseline" snapshot. The file history generated during this operation includes everything in the baseline snapshot as well as the differences between every pair of snapshots that are created next to the other chronologically.

Figure 6A:
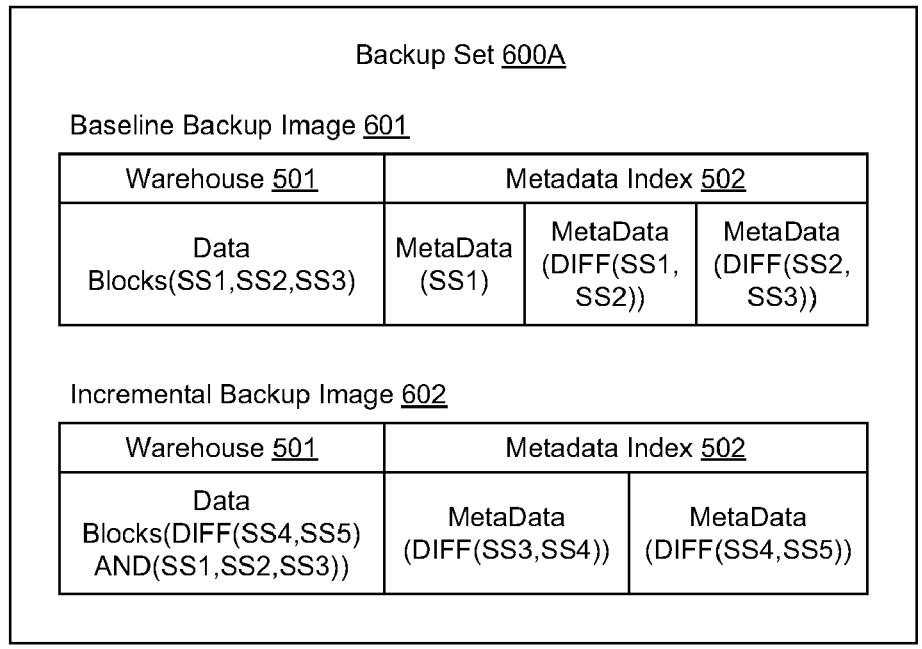
FIGS. 6A and 6B illustrate examples of backup images generated by incremental backup operations.
Figure 6B:
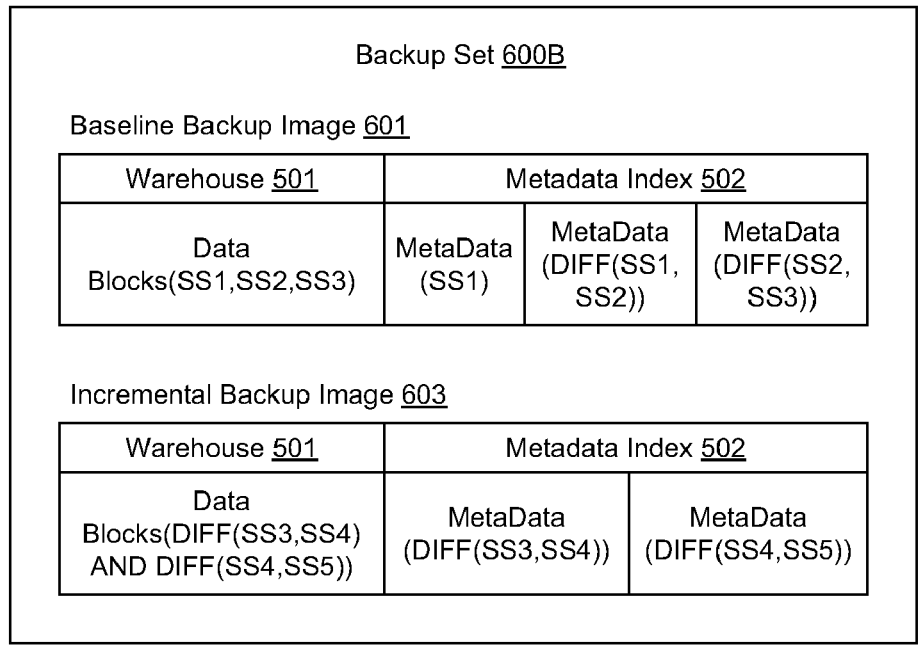

FIGS. 6A and 6B show examples of backup sets, each including multiple backup images generated by the backup engine 450 of FIG. 4 in two consecutive backup operations. In FIG. 6A, backup set 600A includes backup images 601 and 602. Backup image 601 is generated as a baseline backup (which is also referred to as a "level-0" backup), and the backup images 602 and 603 are generated as incremental backups (which are also referred to as level-1 backups). Illustratively, baseline backup image 601 includes the data blocks and metadata blocks of three snapshots $SS_1$, $SS_2$, $SS_3$, without duplication of any common data blocks. In one embodiment, the backup image 601 stores the entire data blocks of snapshot $SS_1$, the difference (shown in FIGS. 6A and 6B as "diff") between $SS_2$ and $SS_1$, and the difference between $SS_3$ and $SS_2$. Note that the actual data blocks in a backup image are stored in the warehouse data structure 501 of the backup image, while metadata identifying the differences ("diff") between snapshots are stored in the metadata index 502 of the same backup image (FIG. 5C).

Incremental backup images 602 and 603 include the data blocks and metadata blocks of two snapshots $SS_4$, $SS_5$. In the embodiment of FIG. 6A, backup image 602 is generated by computing the difference between snapshots ($SS_4$, $SS_5$) and snapshots ($SS_1$, $SS_2$, $SS_3$) with respect to data blocks and metadata blocks in these snapshots. In the embodiment of FIG. 6B, backup set 600B includes backup images 601 and 603. Backup image 603 is generated by computing the difference between snapshots $SS_4$ and $SS_3$, and the difference between $SS_5$ and $SS_4$, with respect to data blocks and metadata blocks. The metadata blocks in the incremental backup images 602 and 603 may also include the parent directories of the files and directories that have been updated since a last backup operation to allow reconstruction of the full pathname of the updated files and directories.

This incremental storage of snapshots and metadata greatly reduces backup storage space at the expense of a slight increase in overhead during data restoration time.

In one embodiment, the image-based backup described herein preserves deduplication, compression and encryption properties of the data. That is, if the source data is deduplicated, compressed or encrypted, the backup data on tape will be stored in the same form. For example, a shared block in a deduplicated volume will be backed up only once in the warehouse data structure 510, therefore making backup efficient for disk reads and tape writes. In addition, the backup image on tape will use less space than it would otherwise, just as with the original volume. Similarly, compressed or encrypted blocks will be read without being decompressed or decrypted when being backed up in the warehouse data structure 510.

Figure 7:
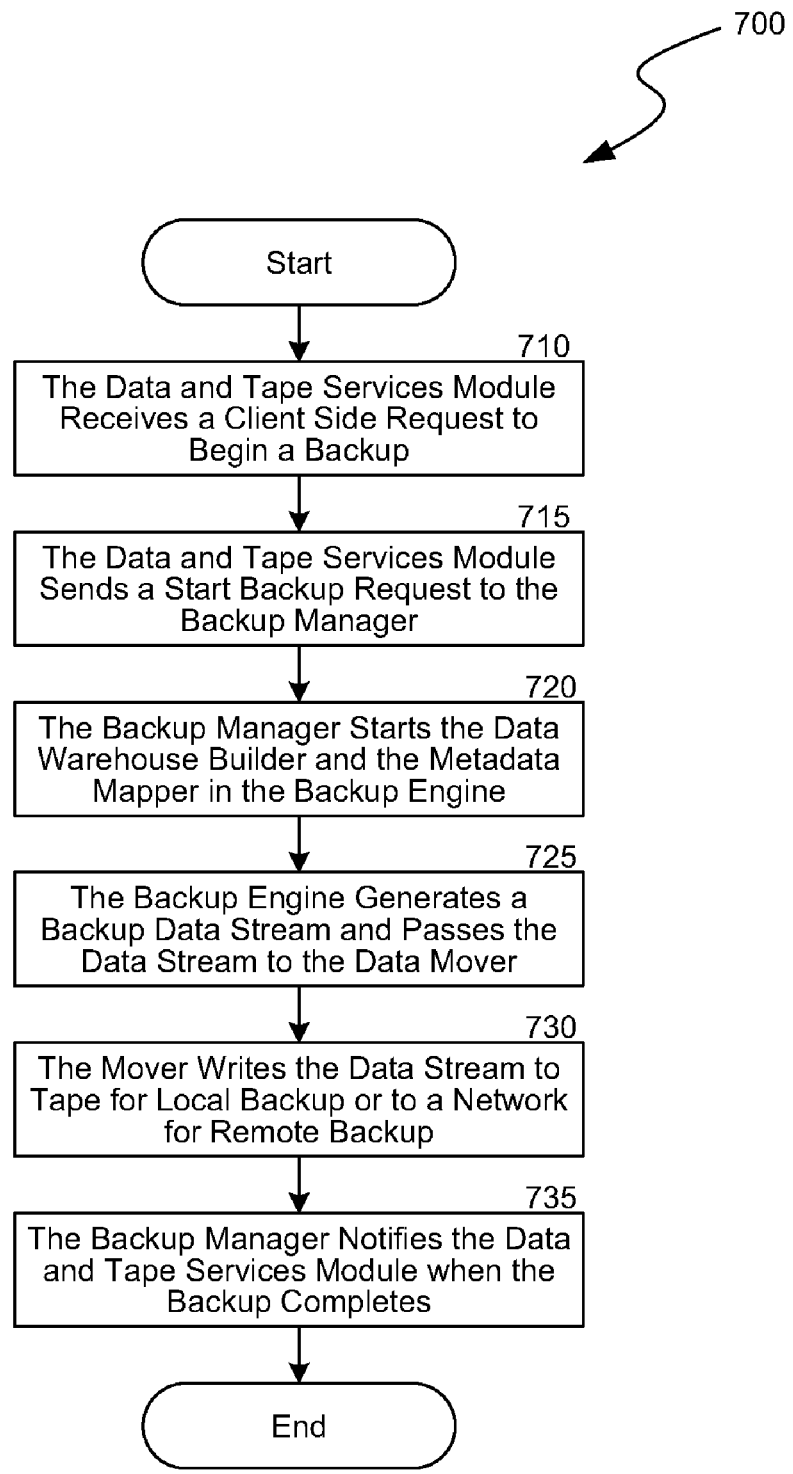
FIG. 7 is a flow diagram illustrating an embodiment of a process of a backup operation.

FIG. 7 is a flowchart illustrating a process 700 for performing an image-based backup operation in accordance with an embodiment of the present invention. Details not germane to the present invention are omitted from the following description. At block 710, the data and tape services module 420 receives a client-side request to begin a backup operation for a volume. In response to the request, at block 715, the data and tape services module 420 sends a start backup request to the backup manager 410. At block 720, the backup manager 410 starts the warehouse data structure builder 451 and the metadata index builder 452, which, at block 725, generates a backup data stream and passes the data stream to the data mover 470. In some embodiments, the backup engine 450 also sends file history information during the backup operation to the requesting client 110. At block 730, the data mover 470 writes the data to tapes 480 for local backup, or to networked storage for remote backup. The backup manager 410 notifies the data and tape services module 420 when the backup operation completes at block 735.

Figure 8:
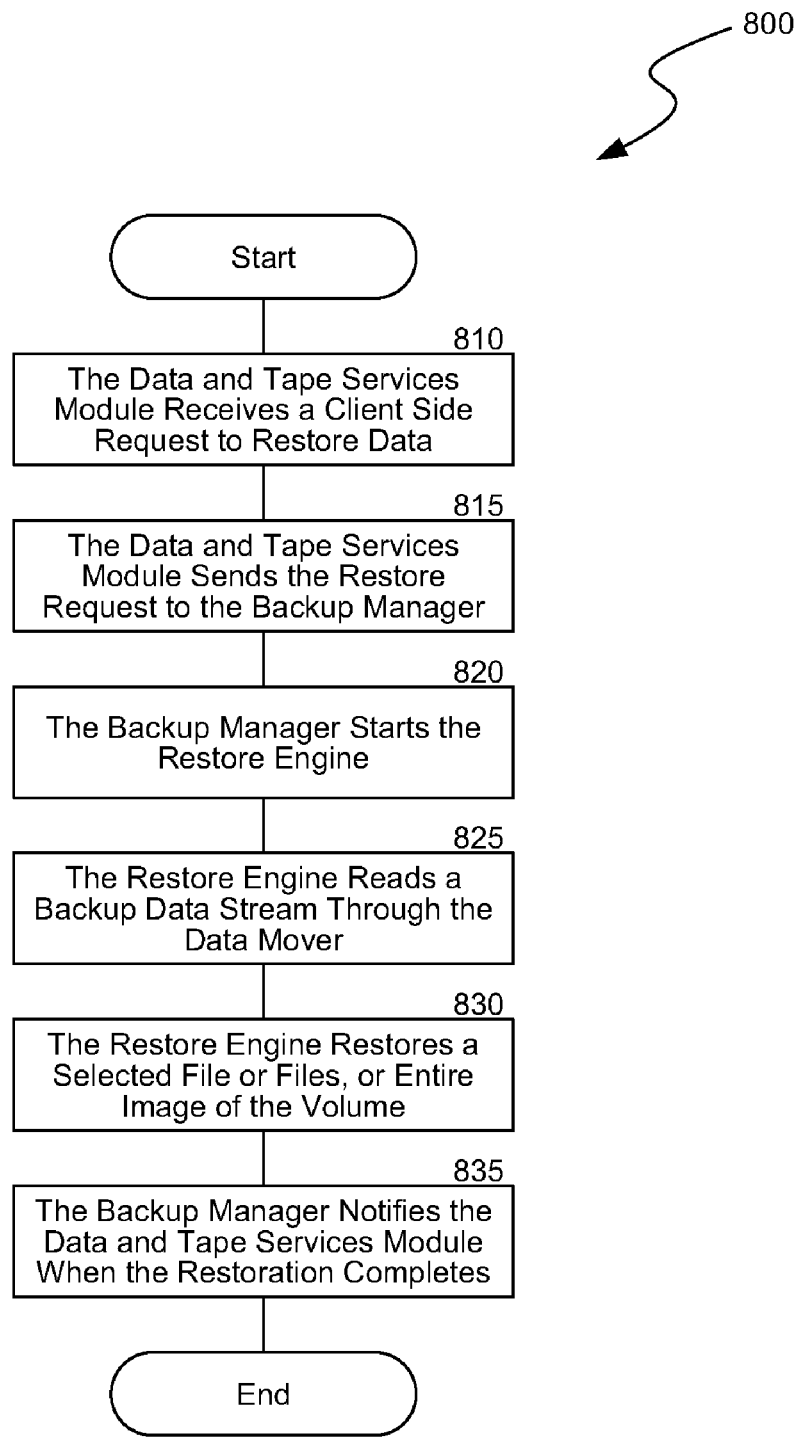
FIG. 8 is a flow diagram illustrating an embodiment of a process of a restore operation.

FIG. 8 is a flowchart illustrating a process 800 for performing a restore operation in accordance with an embodiment of the present invention. Details that are not germane to the purpose of this disclosure are herein omitted. At block 810, the data and tape services module 420 receives a client-side restore request. In some embodiments, prior to sending the restore request, the requesting client 110 may request the data and tape services module 420 to send file history information for determining the data to be restored. Based on the file history information, the requesting client 110 may determine to restore the entire image of the volume including one or more snapshots, or one or more specific snapshots, or one or more specific files or directories within a snapshot. At block 815, the data and tape services module 420 sends the restore request to the backup manager 410. At block 820, the backup manager 410 starts the restore engine 460. At block 825, the restore engine 460 reads the backup data stream through the data mover 470. Depending on the type of restore request received at block 810 (e.g., a request to restore one or more selected files, or a request to restore an entire volume image), the restore engine 460 performs restore operation at block 830.

With respect to restoration of an image, the restore engine 460 restores the data blocks of a backup image into a destination target volume. After all the data blocks are restored, the restore engine 460 activates the restored data for use by the storage server 100. As mentioned above, image restoration does not involve the use of metadata, and is, therefore, faster than restoration of files and directories.

With respect to restoration of file and directories, the logical restore engine 464 uses the FOP module 434 to handle directories and files, as well as I/O operations. The logical restore engine 464 generates FOP requests for directories and files to be restored, and sends the FOP requests to the FOP module 434. Each FOP request may have multiple actions, such as create a directory or file, populate data, set attributes, and the like. Each of these actions is executed by the FOP module 434. The FOP module 434 transforms the actions into file system messages, and sends the messages to the file system asynchronously. "Asynchronously" means that file operations are not blocked when sending out file system messages. When replies from the file system are received by the FOP module 434, the FOP module 434 checks for errors and performs a next action, if any, in the current FOP request until all of the outstanding actions are handled.

When the restore operation completes, the backup manager 410 notifies the data and tape services module 420 at block 835.

When restoring a single file, the logical restore engine 464 uses the metadata in a backup image to find the inode number of the file from its directory inode, locates the file's inode by the inode number, determines the list of VBNs contained in the inode, and then accesses the backup image to retrieve the data blocks identified by the VBNs. When restoring a single file that was backed up with both level-0 (baseline) and level-1 (incremental) backup operations, the logical restore engine 460 first constructs a file from a baseline backup image, and then updates the file using one or more incremental backup images. Alternatively, the logical restore engine 464 first identifies all the data blocks it needs to restore from different backup images based on the metadata map, and then restores the data blocks as necessary. Illustratively, a file with two data blocks (b1, b2) is backed up in a baseline backup, and then one of the data blocks (b2) is modified and backed up in an incremental backup. When restoring the file, the logical restore engine 464 restores b2 from the incremental backup image and b1 from the baseline backup image. In this example, the restore engine 464 does not need to restore both blocks (b1, b2) from the baseline backup.

NDMP Based Block-Level Backup and Single-File Restore

As mentioned above, the single-file backup and restore techniques introduced here can be implemented in conjunction with, or by extending, NDMP. In particular, these techniques may be implemented as extensions to NDMP's direct access recovery (DAR) technique, as will now be further described. In NDMP terminology, DAR is generally driven by a "data management application (DMA)" (or "backup client" herein, e.g., backup software 430), whereas the actual backup and restore operations are executed by a "data server" (or "storage server" herein, e.g., storage server 100).

One feature of the technique introduced here is that it enables the restoring of a particular selected file (or multiple selected files) in a data set (e.g., a volume), from a block-level backup set, by using a client-server backup protocol such as NDMP, without having to restore the entire data set. This functionality is illustrated conceptually in a simplified form in FIG. 6C.

Figure 6C:
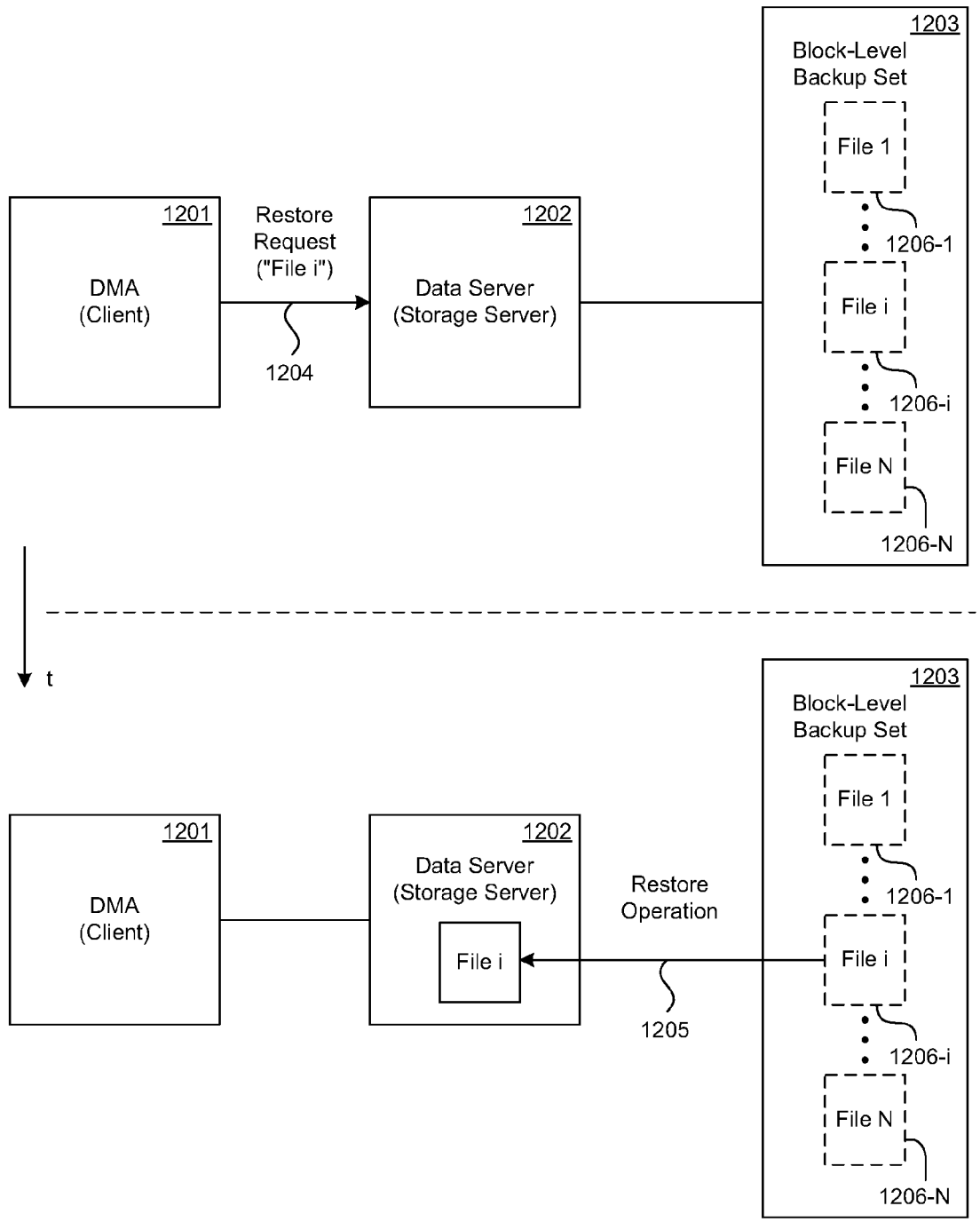
FIG. 6C illustrates the restoring of a selected file from a block-level backup set by using a client-server backup protocol.

In FIG. 6C, a block level backup set 1203 includes multiple files 1206. The files may be contained in one or more backup images (not shown), and each backup image may contain one or more snapshots (not shown), as described above in relation to FIGS. 6A and 6B. To restore a particular file, for example, File i (1206-i), the DMA (client) 1201 sends a restore request 1204 to the data server (e.g., storage server) 1202, identifying the particular file to be restored (other information may also be included in the request, as described below). In response, the data server 1202 selects the appropriate backup image(s) and snapshot(s) which contains the requested file and restores only that file (or files, if multiple files were selected in the request). Since a block-level incremental backup image does not necessarily contain complete file data, a single incremental backup image may not be sufficient to restore a file. To restore a single file, several backup images may be needed to reconstruct the file. Accordingly, the data server 1202 can request the DMA 1201 to switch between different backup images during the restore operation, as necessary to access all of the blocks of the selected file, as described further below.

Because a backup set such as described here can include multiple snapshots, the technique introduced here also enables the restoring of a particular version of a selected file from a block-level backup set, out of multiple backed up versions, by using a client-server backup protocol such as NDMP, without having to restore the entire data set that contains the file. This functionality is illustrated conceptually in a simplified form in FIG. 6D.

Figure 6D:
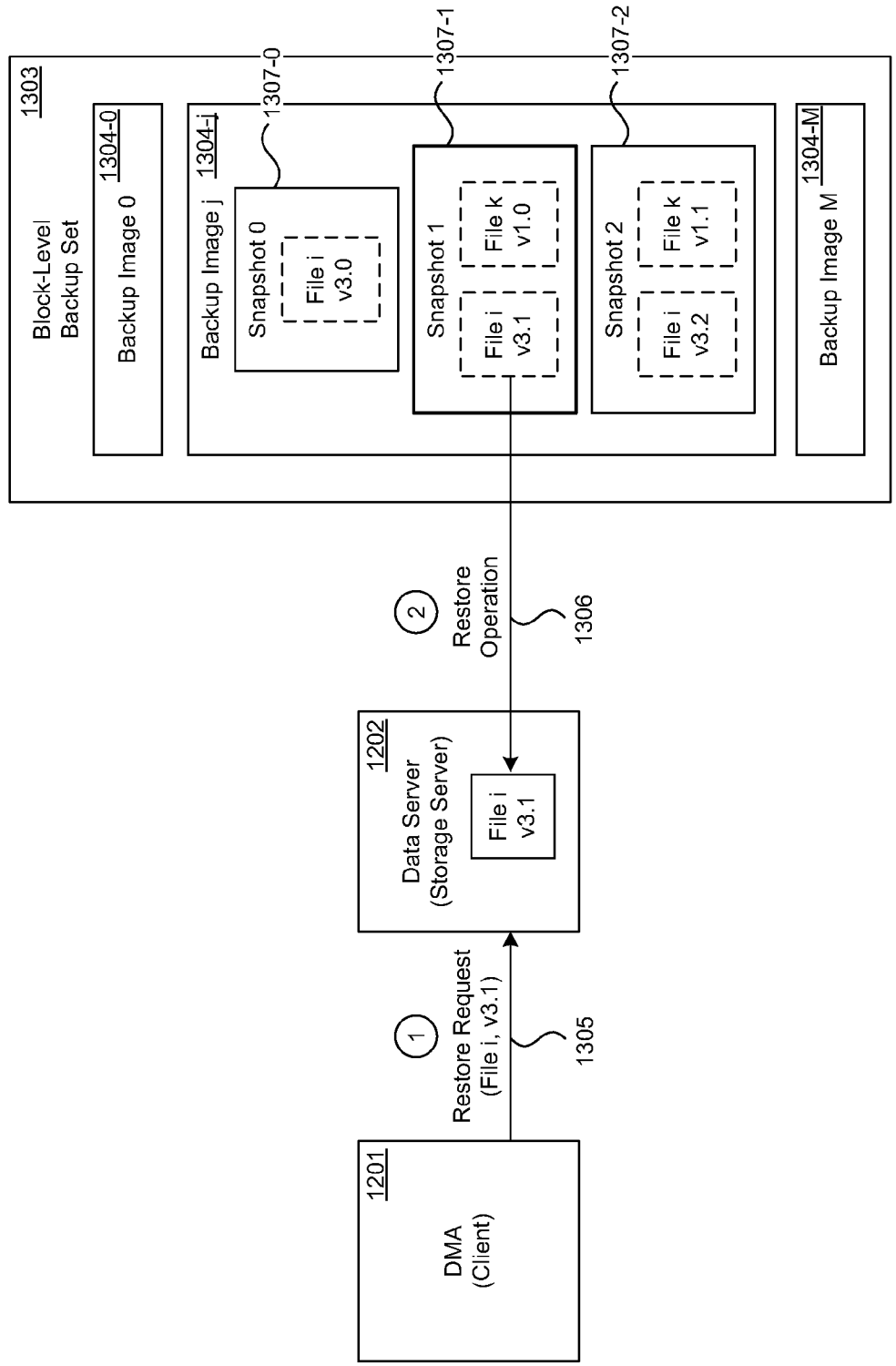
FIG. 6D illustrates the restoring of a selected version of a selected file from a block-level backup set including multiple snapshots by using a client-server backup protocol.

In FIG. 6D, a block level backup set 1303 includes multiple backup images 1304, as described above in relation to FIGS. 6A and 6B. Each backup image 1304 includes one or more snapshots 1307; in the example of FIG. 6D, backup image j (1304-j) includes multiple snapshots 1307. The backup set 1303 further includes multiple files, and each snapshot 1307 corresponds to a different version of at least one file.

To restore a particular version of a particular file, such as version 3.1 of File i, the DMA (client) 1201 sends a restore request 1305 to the data server (e.g., storage server) 1202, identifying the particular file and version to be restored (version can be specified by including a snapshot ID in the restore request, as described further below). In response, the data server 1202 selects the appropriate backup image(s) and snapshot(s) which contains the requested version of the requested file and restores only that particular version of that particular file, as shown.

As noted, the blocks of the selected version of the selected file may be distributed amongst more than one snapshot and more than one backup image. In one embodiment, only the earliest snapshot that contains a given file contains all of the blocks of that file; any subsequent snapshots contain only new or modified blocks of the file. Therefore, to restore a particular version of a file, the data server 1202 would access, in the backup set 1203, the snapshot that corresponds to the requested version and all earlier snapshots in the backup set 1203 that contain blocks of the requested file.

As described above, a backup set includes one or more backup images, including at least a level-0 backup image, and possibly including one or more incremental backup images. A backup set is assigned an identifier (ID) by the data server when a level-0 backup is initiated. The same backup set ID is specified when starting an incremental backup so that the incremental backup can be related to the level-0 backup of the same backup set. The same volume can be backed up by multiple DMA instances in parallel as long as the backup set IDs are different.

Each backup image (i.e., a level-0 or an incremental) in a backup set is assigned a sequence number (image ID). The sequence number uniquely identifies a backup image within a backup set. In one embodiment the sequence number of the level-0 backup image is always "0". Any incremental backup will be assigned a sequence number which is one greater than the sequence number of the previous backup image within the same backup set. The backup set ID is independent of host name, IP address, and other parameters that can change over time.

In one embodiment the backup set ID is generated by the data server and is included in a reply by the data server to a NDMP_DATA_GET_ENV message from the backup client, before finishing the backup session. The data server ensures that the value of the variable is unique for each level-0 backup. The DMA keeps track of this ID so that it can find the backup image when the data server requests it.

As noted above, each backup image can contain multiple snapshots. Accordingly, each snapshot within a backup set is assigned a unique snapshot sequence number (snapshot ID). The snapshot sequence number uniquely identifies a snapshot within a backup set. In one embodiment the snapshot sequence number of the oldest snapshot within a backup set (first snapshot of the level-0 backup image) is always "0". Any other snapshot will be assigned a sequence number that is one greater than the snapshot sequence number of its immediately previous snapshot. Thus, any version of a file in a backup set can be associated with a unique snapshot sequence number.

At the completion of each backup image, the data server includes the Backup Set ID and sequence number in the environment variables in the reply to a NDMP_DATA_GET_ENV from the client. To start an incremental backup of a backup set, the same Backup Set ID is passed from the DMA to the data server in an environment variable in a NDMP_DATA_START_BACKUP message. To start a restore of an individual file or files, the Backup Set ID, snapshot sequence number and filename of each file to be restored are passed by the DMA to the data server, to identify the snapshots that contain the selected file(s).

Unlike with conventional NDMP, the file history messages sent by the data server to the DMA in NDMP DAR are only sent for changed files in the second and subsequent snapshots. Nonetheless, the DMA preferably will still present the user with a complete point-in-time file system view (i.e., all files of the backup set) in each snapshot in the DMA catalog.

Since a block-level incremental backup image does not necessarily contain complete file data, a single incremental backup image may not be sufficient to restore a file. To restore a single file, several backup images may be needed to reconstruct the file.

Consequently, the process for single-file restore is different from the whole-volume restore process. The restore process will start from an incremental backup image which contains the metadata of the files and directories to be restored. The restore process recovers the file metadata and builds a list of offsets for data blocks to be recovered. From the metadata in the backup image, the restore process knows which backup image(s) is/are needed to recover which data blocks.

The restore process recovers the data blocks from the current backup image and then requests the DMA to load other backup images to recover additional data blocks. The data server uses offset information obtained from the metadata in the first backup image to seek to the data blocks without scanning the whole backup image.

The restore process will be done in one restore session. Since multiple backup images may be needed, the data server uses a notification message, NDMP_IB_NOTIFY_CHANGE_BACKUP_IMAGE, to request the DMA to load a different backup image. After loading the new backup image, the DMA issues a continue restore message, NDMP_IB_DATA_CONTINUE_RECOVER, to the data server to continue on to the newly loaded backup image. The data server stays in Active state during this period.

Figure 9:
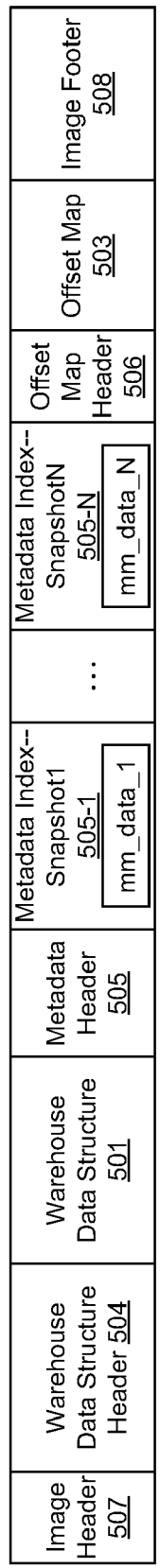
FIG. 9 illustrates an example of the format of a backup image in greater detail.

In certain embodiments, each backup image in a backup set has a format according to FIG. 5C and, as more specifically shown, according to FIG. 9. As shown in FIG. 9, the metadata index 502 includes a separate section for each of the (N) snapshots in the backup image.

Figure 10:
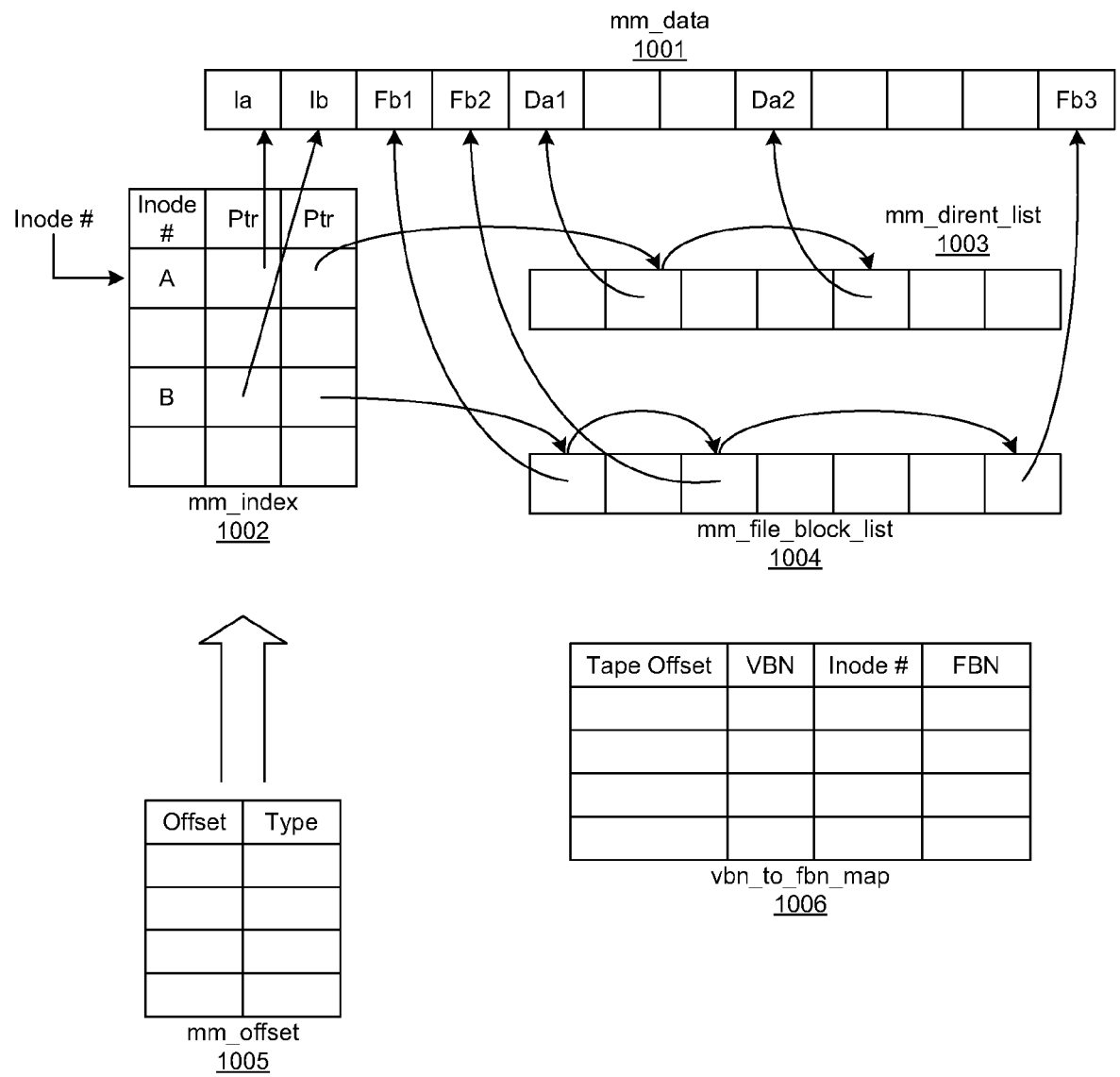
FIG. 10 illustrates the relationships between various working files used to perform single file restore.

In certain embodiments the backup manager 410 maintains several working files to facilitate backup and restore operations, as described now with reference to FIG. 10. A first working file 1001 is called mm_data. In one embodiment, there is only one mm_data file for each backup set, which can contain multiple sections, one for each snapshot. The mm_data file contains metadata entries of three types: inode entries, directory entries, and file block list entries (also called VBN extent or "VBNX" entries) for the changed files or directories of the snapshot. There is no required order for the entries in the mm_data file. The mm_data file is created or modified on tape, in the metadata index 502 of the backup image, when a backup image is created or modified, respectively, and then read into memory of the data server upon initiation of a restore operation. The remaining working files described below are all created by the data server upon initiation of a restore operation.

A second working file 1002 is called mm_index. The mm_index file indicates the order of contents in mm_data to allow efficient retrieval of that information. Each snapshot has an mm_index file for mapping an inode number to its inode attributes, directory entries (for directory inode), or file block list (for files). With two other working files, mm_direct_list 1003 and mm_file_block_list 1004, the mm_index file ties all inode related information in mm_data together. Each entry in mm_index includes the inode number, a pointer to the corresponding entry in the mm_data file, and a pointer to the corresponding entry in either the mm_direct_list file (if the inode is for directory) or the mm_file_block_list file (if the inode is for a file).

For example, in FIG. 10, there are two inodes represented, A and B. Inode A has attributes in the mm_data file as Ia, and Inode B has inode attributes in the mm_data file as Ib. Inode A represents a directory which has two directory entries Da1 and Da2. Inode B represents a file which has three data block list entries in mm_data as Fb1, Fb2, and Fb3.

Each file block list (VBNX) entry in mm_data (e.g., Fb1, Fb2) includes the VBN (location of the data block in the original volume), the FBN of the block in the file, the number of contiguous blocks (VBNs), and a flag indicating whether the block has changed from the previous snapshot. The content of a directory entry in mm_data includes the inode number and directory entry name. The content of an inode entry in mm_data essentially includes the inode itself (an inode is the same size as a data block).

As shown in FIG. 10, mm_dirent_list is a linked list, in which each entry points to an entry in mm_data and the next entry in mm_dirent_list. Similarly, mm_file_block_list is a linked list, in which each entry points to an entry in mm_data and the next entry in mm_file_block_list.

To locate a given data block in a backup set on tape, the data server 100 starts with the inode of the file or directory to which the block belongs and uses it as an index into mm_index, to locate the appropriate entry in either mm_dirent_list or mm_file_block_list. The identified entry in mm_dirent_list or mm_file_block_list is then used to locate the appropriate entry in mm_data.

Another working file, called mm_offset 1005, is used to build mm_index. For each entry in the mm_data file, the mm_offset file contains the starting offset of the entry in the mm_data file and the type of that entry, i.e., inode, directory or VBNX.

Another working file is the acl_dfile file (not shown). This file stores data blocks of access control lists (ACLs) to be recovered. At the end of a restore process, any ACL data of a recovered inode are read from acl_dfile and set for that inode.

Yet another working file is the vbn_to_fbn_map file 1006. This file is used to make reading blocks from tape more efficient (sequential) as well as to enable determination of where the read blocks should be put. Each entry in this file has the following fields: Tape Offset, VBN, Inode Number and FBN. A data block identified by the VBN field will be read from tape at the offset indicated by Tape Offset, and then written to the inode having Inode Number, at a file offset of FBN. Entries in this file are sorted according to Tape Offset, for read efficiency. As a result of this sorting, when restoring data blocks for one file or multiple versions of one file, it is only necessary to scan the tape once to locate all the relevant data blocks. Furthermore, the same tape read efficiency can be achieved for restoring multiple files in response to a single restore request, by sorting entries from all files in this way.

Finally, a working file called vdisk (not shown) stores metadata about LUNs, such as inode numbers. LUNs are initially restored as regular files, and inode information is written to disk. At the end of the restore process, the vdisk file is processed and entries in it are converted from regular files to LUN files.

Figure 11:
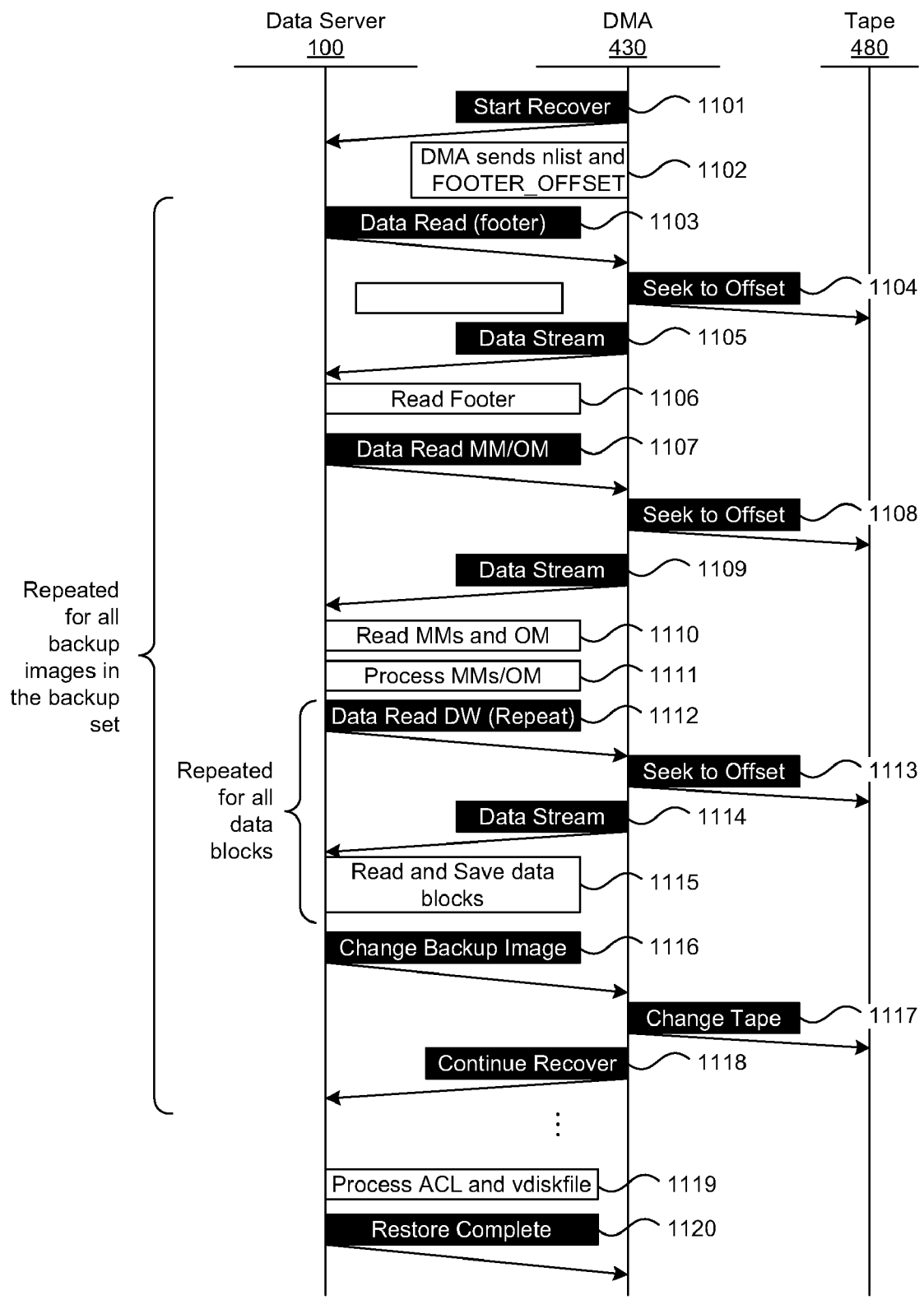
FIG. 11 illustrates the interaction between data server, data management application (DMA) and tape during a single file restore process.

The process of single file restore will now be described in greater detail, with further reference to FIGS. 9 and 10 and reference to FIG. 11. FIG. 11 shows the interaction between DMA and data server to perform single file restore. The shaded boxes in FIG. 11 represent NDMP protocol messages. The unshaded boxes represent comments or actions.

Single file restore starts with the DMA requesting the data server to restore one or more individual files, by sending to the data server a START_RECOVER message (1101) and a list of the files top be recovered, called the "nlist" (1102). The nlist contains the source file path, destination file path, inode number, and snapshot sequence number of each selected file. The data server sorts the nlist according to snapshot sequence number and stores it on disk. The data server creates all destination files before processing the metadata indexes. All files are empty, and the destination inodes are remembered.

An environment variable, FOOTER_OFFSET, is also passed to the data server in the initial restore request (e.g., START_RECOVER) and in subsequent NDMP_IB_DATA_CONTINUE_RECOVER messages. Each backup image has its own FOOTER_OFFSET. This variable contains the offset on tape of the image footer 508 of the backup image. The following steps (1103-1110) are then performed by the data server to download the Metadata Indexes and Offset Maps from tape onto disk.

First, the data server reads and validates the Image Header 507 from tape. The data server then sends a tape seek request (1103) to the DMA to seek to FOOTER_OFFSET, which the DMA does (1104) and returns the data stream to the data server (1105). Next the data server downloads the Image Footer section from tape and saves that information in a convenient storage location (1106). The Image Footer contains information about tape locations for Metadata Indexes and Offset Map. The data server then sends a request to the DMA (1107) to seek the tape to the first Metadata Map location, which the DMA does (1108) and returns the data stream to the data server (1109). The data server then downloads all Metadata Indexes and the Offset Map onto disks (1110).

A Metadata Index 502 on tape has two sections: a metadata section and a backup records section. Each metadata entry in the Metadata Index 502 has a corresponding backup record in the backup records section. A metadata entry in the Metadata Index 502 describes what data has been changed, and the corresponding backup record describes how the metadata entry was changed (e.g., created, deleted, modified) and includes an offset of the metadata entry in the mm_data file 1001. The metadata section is downloaded into the mm_data file 1001 when the backup image is loaded. The backup records section is processed on-the-fly during download, and the mm_index, mm_dirent_list, and mm_file_block_list files are created from it for each snapshot.

With the Metadata Index database retrieved, the data server then processes the metadata Index and offset map (1111). In particular, the data server finds the information about the files to be recovered from the nlist. The data server uses the snapshot sequence numbers and inode numbers in the nlist to find the inodes in corresponding Matadata Indexes. The searching proceeds from latest snapshot to oldest snapshot. Using the inode attributes (e.g., type, file size, creation time, modified time), the data server can determine whether the inode has associated Windows streams (e.g., additional inode attributes such as an icon file, thumb print, or additional information about the inode). A stream directory will be created for the inode, and empty stream files are created. Inodes of those streams are appended to the nlist for further processing.

Using the inode information, the data server also determines whether each inode has an associated ACL. To recover ACL information, the acl_dfile file is used to recover all the ACL data blocks. An ACL mapping file is used to maintain the knowledge of inode number to ACL inode number. For ACL, data blocks will be written to the acl_dfile. For LUN files, a vdisk file entry will be created.

Using the inode information, the data server also finds the list of data blocks used by a file. The file block list is retrieved and the Offset Map is consulted to build the vbn_to_fbn_map file.

After the vbn_to_fbn_map file is built, the data server sorts the file according to tape offset, and then the data server requests (1112) the DMA to seek to specific tape offsets and read the data blocks from tape (i.e., from the warehouse data structure 501 of the appropriate backup image). The DMA performs the seek (1113) and returns the data stream to the data server (1114). When a data block is read from tape (1115), the data server can associate the data block with the inode specified in the vbn_to_fbn_map entry at the specified FBN location. Since the vbn_to_fbn_map file is sorted according to tape offset, the reading of data from tape is a one-pass operation.

Since the nlist may not be resolved with only one backup image, and the needed file blocks may exist in a previous backup image, the data server may need to ask the DMA to load an additional (older) backup image by sending a CHANGE BACKUP Image message (1116). The DMA then changes the tape (1117) if necessary, and sends a CONTINUE RECOVER message (1118) to the data server. The data server then performs downloading of Metadata Indexes and Offset Map, processing of Metadata Indexes, and reading of data blocks, in the same manner as described above (1102-1115). The process continues in this way until all files in the nlist are resolved and all data blocks for files to be restored are recovered. This should happen when the level-0 backup image is processed.

The last operation of the data server in a restore is to recover ACL and LUN files (1119). All ACL data written to the acl_dfile are read back and set to the specific inode associated with the ACL data. The vdisk file are processed, and recovered LUN files are converted from regular files to LUN files. When this operation is completed, the data server sends a RESTORE COMPLETED message (1120) to the DMA to indicate completion of the restore process.

To support multiple snapshots, file history messages sent by the data server do not need to follow NDMP_FH_ADD_DIR rules No. 5 and 6 specified in NDMP version 4, which define an ordering in which NDMP_FH_ADD_DIR and NDMP_FH_ADD_NODE entries are to be sent. With the technique introduced here, file history messages for the directories and files instead may be sent in any order, regardless of any directory-file relationships. More specifically, in one embodiment the ordering of file history entries differs from that of the traditional NDMP file history model in the following ways:
1) Entries are generated at any phase of the backup;
2) Directory and node entries are intermixed;
3) Entries from different snapshots are intermixed; and
4) Entries are not in inode order or any other order.

To restore a particular version of file from a multiple-snapshot backup, a way is needed to uniquely identify a version of a file in such a multiple-snapshot backup. One approach to doing so is to use a new file history format to pass snapshot information explicitly, i.e., a new file history format which specifies the snapshot with which the history data is associated.

Another approach is to use the existing NDMP file history format to convey snapshot information implicitly: For example, file history for files in snapshots can be sent under virtual directories. The data server can use a virtual directory, e.g., "/.snapshot", as container directory for all snapshots. Under that virtual directory, each snapshot has its own virtual directory, e.g., "<snapshot sequence number>". The /.snapshot and snapshot directories have their own inode numbers. The inode numbers of files and directories under the virtual snapshot directories are converted so that they do not conflict with inode numbers of the other files under the same backup image. The following is what can happen for file history under this approach:

At the root of the volume, a file history entry representing the virtual directory called ".snapshot" with its own unique inode number is sent from the data server to the DMA during the backup:
1. Under the ".snapshot" directory, additional file history representing each virtual snapshot directory is sent from the data server to the DMA.
2. The file history information is sent from the data server to the DMA for directories/inodes in snapshots. This allows each file to be resolved to a different snapshot root. The inode number for entries in snapshots are precluded from being the actual inode numbers, to avoid inode number collisions. A virtual inode number using a combination of snapshot sequence number and actual inode number is used for each inode in a snapshot.

The advantage of this second approach is that it uses the existing file history mechanism. However, due to the generation of virtual inode numbers to avoid collisions; the restore engine 460 (FIG. 4) in the data server will tend to be more complicated, since it needs to convert the virtual inode number back to the original inode number in each snapshot to retrieve metadata information. Also, it is more difficult for the DMA to construct a full file system view in each snapshot in the DMA catalog. The first approach, one the other hand, explicitly provides the snapshot information as part of the file history. This allows the DMA to intelligently build catalog to present complete file system view for snapshots.

Unlike legacy dump images, an incremental backup image according to the techniques introduced here depends on a previous incremental backup image or a level-0 backup image. Consequently, the DMA's expiration policy for backups should only allow expiration of an entire backup set or expiration from the most recent incremental backup image to the related level-0 backup image in reverse chronological order.

The techniques introduced above can be implemented in software and/or firmware in conjunction with programmable circuitry, or entirely in special-purpose hardwired circuitry, or in a combination of such embodiments. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:
1. A method comprising:
receiving at a network storage server, from a backup client, a request identifying a particular file to be restored from a block-level backup set of a data set that contains a plurality of files; and
restoring the file from the block-level backup set at the network storage server by using a client-server backup protocol, without restoring the entire data set from the backup set, wherein restoring the file from the backup set includes
using a first backup image in the backup set, at the network storage server; and
in response to a determination at the network storage server that a second backup image in the backup set is needed to continue restoration of the file, automatically suspending restoration of the file and sending a request for the backup client to change from the first backup image to the second backup image, from the storage server to the backup client.

2. A method as recited in claim 1, wherein the backup set includes an incremental backup image, and wherein said restoring comprises restoring the file from the backup set at least partially from the incremental backup image.

3. A method as recited in claim 1, wherein there is no duplication of data blocks within the backup set.

4. A method as recited in claim 1, wherein the client-server backup protocol allows backup software on a client machine to manage backup and restore jobs running on a storage server.

5. A method as recited in claim 4, wherein the client-server backup protocol is a version of NDMP.

6. A method as recited in claim 1, wherein each of a plurality of backup images in the backup set includes data blocks representative of a snapshot of the data set.

7. A method as recited in claim 6, wherein the plurality of backup images in the backup set have no data blocks in common.

8. A method as recited in claim 6, wherein at least one of the backup images in the backup set includes data blocks representative of a plurality of snapshots of the data set.

9. A method as recited in claim 8, wherein the request includes an indicator corresponding to a particular version of the file, and wherein said restoring comprises restoring the particular version of the file, by selecting one of the snapshots associated with the particular version and using the selected snapshot to restore the file.

10. A method as recited in claim 1, wherein the request specifies a plurality of files in the data set that are to be restored from the backup set, and wherein the method comprises:
    restoring each of the files specified by the request from the backup set in response to said request, without restoring the entire data set.

11. A method as recited in claim 1, wherein the backup set includes a plurality of backup images, and wherein restoring the file from the backup set comprises:
    restoring a plurality of different versions of the file, by using two or more of the backup images in the backup set.

12. A method as recited in claim 11, wherein the request includes information for identifying said two or more of the backup images.

13. A method as recited in claim 11, wherein each of the backup images in the backup set includes data blocks representative of a snapshot of the data set.

14. A method as recited in claim 13, wherein the plurality of backup images in the backup set have no data blocks in common.

15. A method as recited in claim 13, wherein at least one of the backup images in the backup set includes data blocks representative of a plurality of snapshots of the data set.

16. A method as recited in claim 1, wherein restoring the file from the backup set further comprises:
    receiving at the network storage server, from the backup client, a continue command, after the backup client has accessed a backup storage facility which contains the backup set and changed from the first backup image to the second backup image; and
    continuing restoration of the file using the second backup image in response to receipt of the continue command.

17. A method as recited in claim 1, further comprising:
    creating the backup set, prior to receiving the request identifying the particular file to be restored, by storing a plurality of sequential backup images to a backup storage facility, wherein each of the backup images includes
        a first portion containing data blocks representing at least one snapshot of the data set, and
        a separate second portion for each snapshot represented in the backup image, each said second portion containing metadata for the corresponding snapshot of the data set.

18. A method as recited in claim 17, wherein the plurality of backup images in the backup set have no data blocks in common.

19. A method as recited in claim 1, wherein the backup set is stored in a backup storage facility that comprises a tape backup device including a tape medium storing blocks of the file, and wherein restoring the file from the backup set comprises scanning the tape medium only once to locate all data blocks needed for restoring the file.

20. A method comprising:
    creating, at a storage server, a block-level backup set of a data set that contains a plurality of files, wherein the backup set includes a plurality of backup images, including a baseline backup image and an incremental backup image, each of the plurality of backup images representing at least one snapshot of the data set, wherein there is no duplication of data blocks among the snapshots represented in the plurality of backup images, each of the plurality of backup images of the data set including
        a first portion containing data blocks of at least one snapshot of the data set, and
        a separate second portion for each snapshot represented in the backup image, each said second portion containing metadata for the corresponding snapshot;
    receiving at the network storage server, from a backup client, a request to restore a particular file from the block-level backup set; and
    restoring the particular file from the block-level backup set, at the network storage server, including using a client-server backup protocol, without restoring the entire data set, wherein restoring the file from the backup set includes
        using a first backup image in the backup set, at the network storage server;
        in response to a determination at the network storage server that a second backup image in the backup set is needed to continue restoration of the file, automatically suspending restoration of the file and sending a request for the backup client to change from the first backup image to the second backup image, from the storage server to the backup client;
        receiving at the network storage server, from the backup client, a continue command, after the backup client has accessed a backup storage facility which contains the backup set and changed from the first backup image to the second backup image; and
        continuing restoration of the file using the second backup image in response to receipt of the continue command.

21. A method as recited in claim 20, wherein the backup storage facility comprises a tape backup device.

22. A method as recited in claim 20, wherein the client-server backup protocol allows backup software on a client machine to manage backup and restore jobs running on a storage server.

23. A method as recited in claim 20, wherein:
    at least one of the backup images in the backup set includes data blocks representative of a plurality of snapshots of the data set; and responding to the request by using two or more of the backup images in the backup set to restore the file.

24. A method as recited in claim 20, wherein the request includes a list of files, in the data set, that are to be restored from the backup set, the list identifying a plurality of files, and wherein the method comprises:
    restoring each of the files in the list from the backup set in response to said request, without restoring the entire data set.

25. A method as recited in claim 20, wherein restoring the file from the backup set comprises:
    restoring a plurality of different versions of the file, by using two or more of the backup images in the backup set.

26. A storage server comprising:
    a processor;
    a network interface through which to communicate with a backup client over a network;
    a storage interface through which to access a backup storage facility; and
    a memory storing code, execution of which by the processor causes the storage server to perform a process which includes
        creating, in the backup storage facility, a block-level backup set of a data set that contains a plurality of files, wherein the backup set includes a plurality of backup images, including a baseline backup image and an incremental backup image;
        receiving from the backup client a request identifying a particular file to be restored from the backup set; and
        restoring the file from the backup set, including using a client-server backup protocol, without restoring the entire data set, wherein restoring the file from the backup set further includes
            using a first backup image in the backup set, at the network storage server; and
            in response to a determination at the network storage server that a second backup image in the backup set is needed to continue restoration of the file, automatically suspending restoration of the file and sending a request for the backup client to change from the first backup image to the second backup image, from the storage server to the backup client.

27. A storage server as recited in claim 26, wherein each of the plurality of backup images represents at least one snapshot of the data set.

28. A storage server as recited in claim 27, wherein no two snapshots represented in the plurality of backup images have any data blocks in common.

29. A storage server as recited in claim 27, wherein each of the plurality of backup images of the data set comprises:
    a first portion containing data blocks of at least one snapshot of the data set, and
    a separate second portion for each snapshot represented in the backup image, each said second portion containing metadata for the corresponding snapshot.

30. A storage server as recited in claim 26, wherein the backup storage facility comprises a tape backup device.

31. A storage server as recited in claim 26, wherein the client-server backup protocol allows backup software on a client machine to manage backup and restore jobs running on a storage server.

32. A storage server as recited in claim 30, wherein the client-server backup protocol is a version of NDMP.

33. A storage server as recited in claim 26, wherein at least one of the backup images in the backup set includes data blocks representative of a plurality of snapshots of the data set.

34. A storage server as recited in claim 33, wherein the request includes an indicator corresponding to a particular version of the file that is to be restored from the backup set, and wherein said restoring comprises restoring the particular version of the file, by selecting one of the snapshots associated with the particular version and using the selected snapshot to restore the file.

35. A storage server as recited in claim 26, wherein restoring the file from the backup set comprises:
    responding to the request by using two or more of the backup images in the backup set to restore the file.

36. A storage server as recited in claim 26, wherein the request includes a list of files, in the data set, that are to be restored from the backup set, the list identifying a plurality of files, and wherein the method comprises:
    restoring each of the files in the list from the backup set in response to said request, without restoring the entire data set.

37. A storage server as recited in claim 26, wherein restoring the file from the backup set comprises:
    restoring a plurality of different versions of the file, by using two or more of the backup images in the backup set.

38. A storage server as recited in claim 37, wherein the request includes information for identifying said two or more of the plurality of backup images.

39. A storage server as recited in claim 26, wherein restoring the file from the backup set comprises:
    receiving at the network storage server, from the backup client, a continue command, after the backup client has accessed a backup storage facility which contains the backup set and changed from the first backup image to the second backup image; and
    continuing restoration of the file using the second backup image in response to receipt of the continue command.

* * * * *